(12) United States Patent
Shen et al.

(10) Patent No.: US 11,378,189 B2
(45) Date of Patent: Jul. 5, 2022

(54) FLOW RATE CONTROL VALVE AND COOLING SYSTEM

(71) Applicant: HITACHI AUTOMOTIVE SYSTEMS, LTD., Hitachinaka (JP)

(72) Inventors: Zhenyu Shen, Zama (JP); Hideaki Nakamura, Yokohama (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 58 days.

(21) Appl. No.: 16/084,684

(22) PCT Filed: Feb. 17, 2017

(86) PCT No.: PCT/JP2017/005801
§ 371 (c)(1),
(2) Date: Sep. 13, 2018

(87) PCT Pub. No.: WO2017/159206
PCT Pub. Date: Sep. 21, 2017

(65) Prior Publication Data
US 2019/0072191 A1    Mar. 7, 2019

(30) Foreign Application Priority Data

Mar. 16, 2016  (JP) .............................. JP2016-052299

(51) Int. Cl.
*F16K 5/04*        (2006.01)
*F16K 27/06*       (2006.01)
(Continued)

(52) U.S. Cl.
CPC ............ *F16K 5/0407* (2013.01); *F01P 7/165* (2013.01); *F16K 11/076* (2013.01);
(Continued)

(58) Field of Classification Search
CPC ...... F16K 5/0407; F16K 27/06; F16K 27/065; F16K 27/12; F16K 11/076; F16K 11/085;
(Continued)

(56) References Cited

U.S. PATENT DOCUMENTS 5,043,649 A   8/1991  Murakami et al.
5,356,112 A   10/1994 Simar
(Continued)

FOREIGN PATENT DOCUMENTS

EP    01156243 A    11/2001
JP    H02-256978 A  10/1990
(Continued)

OTHER PUBLICATIONS

Office Action issued in corresponding Japanese application No. 2016-052299, dated Nov. 12, 2019 with English translation.

*Primary Examiner* — Craig J Price
*Assistant Examiner* — Andrew J Rost
(74) *Attorney, Agent, or Firm* — Foley & Lardner LLP

(57) ABSTRACT

A flow rate control valve has a housing including a valve body and a main communication hole and auxiliary communication holes. The valve body includes a fluid inflow portion, a main opening portion and auxiliary opening portions formed on the valve body circumferential wall and establish fluid communication. A seal member is provided between the main communication hole and the valve body, and configured to seal between the valve body and the main communication hole. The valve body establishes the communication between one auxiliary communication hole and one auxiliary opening portion regardless of a rotational position of the valve body. In addition, the valve body changes a communication state between the main communication hole and the main opening portion and a communication state between another auxiliary communication (Continued)

hole and another auxiliary opening portion according to the rotational position of the valve body.

18 Claims, 16 Drawing Sheets

(51) Int. Cl.
    *F16K 31/53*     (2006.01)
    *F01P 7/16*     (2006.01)
    *F16K 11/087*     (2006.01)
    *F16K 11/076*     (2006.01)
    *F16K 11/085*     (2006.01)
    *F01P 7/14*     (2006.01)
    *F16K 27/12*     (2006.01)

(52) U.S. Cl.
    CPC ........ *F16K 11/085* (2013.01); *F16K 11/0876* (2013.01); *F16K 27/06* (2013.01); *F16K 27/065* (2013.01); *F16K 31/535* (2013.01); *F01P 2007/146* (2013.01); *F16K 27/12* (2013.01)

(58) Field of Classification Search
    CPC .... F16K 11/0876; F16K 31/535; F16K 11/08; F16K 31/041; F01P 7/165; F01P 2007/146
    USPC ........................................................ 251/207
    See application file for complete search history.

(56) References Cited

U.S. PATENT DOCUMENTS

| | | | | |
|---|---|---|---|---|
| 5,893,392 | A * | 4/1999 | Spies | F16K 11/0853 137/625.47 |
| 5,957,377 | A | 9/1999 | Inoue et al. | |
| 5,983,937 | A | 11/1999 | Makihara | |
| 6,539,899 | B1 * | 4/2003 | Piccirilli | F01P 7/167 123/41.08 |
| 6,681,805 | B2 * | 1/2004 | McLane | B60H 1/00485 137/625.16 |
| 6,688,333 | B2 * | 2/2004 | McLane | B60H 1/00485 123/41.1 |
| 9,617,906 | B2 * | 4/2017 | Lee | F01P 7/14 |
| 9,670,825 | B2 * | 6/2017 | Murakami | F16K 11/085 |
| 9,803,764 | B2 * | 10/2017 | Chang | F01P 7/14 |
| 2004/0173167 | A1 | 9/2004 | Chanfreau | |
| 2014/0190427 | A1 | 7/2014 | Nagahama et al. | |
| 2016/0010536 | A1 | 1/2016 | Murakami et al. | |
| 2019/0017612 | A1 * | 1/2019 | Ikemoto | F01P 7/16 |

FOREIGN PATENT DOCUMENTS

| | | | |
|---|---|---|---|
| JP | H06-159541 A | 6/1994 | |
| JP | H09-274521 A | 10/1997 | |
| JP | 2001-159471 A | 6/2001 | |
| JP | 3341523 B2 | 11/2002 | |
| JP | 2004-534177 | 11/2004 | |
| JP | 2013-068162 A | 4/2013 | |
| JP | 2016-31140 A | 3/2016 | |
| WO | WO 2014/148126 A1 | 9/2014 | |
| WO | WO-2014148126 A1 * | 9/2014 | ................ F01P 3/20 |

\* cited by examiner

FLOW RATE CONTROL VALVE AND COOLING SYSTEM

TECHNICAL FIELD

The present invention relates to a flow rate control valve and a cooling system.

BACKGROUND ART

As this kind of technique, there is disclosed a technique discussed in the following patent literature, PTL 1. PTL 1 discloses a flow control valve including a valve body rotatably provided in a valve housing. A hot-water inlet pipe, through which hot water from an engine flows into the flow control valve, and a hot-water outlet pipe, which causes the inflowing hot water to flow out toward a heat exchanger, are integrally formed in the valve housing. Seal members made from elastic materials such as rubber are provided between the hot-water inlet pipe and the valve body and between the hot-water outlet pipe and the valve body, respectively.

CITATION LIST

Patent Literature

[PTL 1] Japanese Patent No. 3341523

SUMMARY OF INVENTION

Technical Problem

In the technique discussed in the above-described patent literature, PTL 1, the seal members are provided between the hot-water inlet pipe and the valve body and between the hot-water outlet pipe and the valve body, respectively, so that high sliding resistance is generated between the valve body and the seal members. Therefore, this technique raises a possibility that a rotational torque excessively increases when the valve body is rotated.

An object of the present invention is to provide a flow rate control valve and a cooling system capable of reducing the torque when the valve body in the housing is rotationally driven.

Solution to Problem

To achieve the above-described object, according to a first aspect of the present invention, a flow rate control valve includes a seal member provided between a main communication hole and a valve body and configured to prevent or reduce a leak of fluid from the main communication hole or a main opening portion into a space portion. The valve body configured to be rotationally driven by a drive mechanism establishes communication between a first auxiliary communication hole and a first auxiliary opening portion regardless of a rotational position of the valve body, and also changes a communication state between the main communication hole and the main opening portion and a communication state between a second auxiliary communication hole and a second auxiliary opening portion according to the rotational position of the valve body. A pressure drop is caused due to a space portion on the fluid leaked out into the second auxiliary communication hole via the space portion formed between an inner peripheral surface of a valve body containing portion and an outer peripheral surface of a valve body circumferential wall. An amount of the fluid leaked out into the second auxiliary communication hole is set according to an allowable amount for an apparatus to which the main communication hole is connected with the main communication hole and the main opening portion in communication with each other and the second auxiliary communication hole and the second auxiliary opening portion out of communication with each other.

According to a second aspect, a flow rate control valve includes a contact seal member provided between a housing and a valve body and configured to seal between the valve body and the housing by abutting against an outer peripheral surface of the valve body. The valve body changes a communication state between a main communication hole and a main opening portion and respective communication states between auxiliary communication holes and a plurality of auxiliary opening portions, according to a rotational position. The auxiliary communication holes include a first auxiliary communication hole constantly in communication with a first auxiliary opening portion and a second auxiliary communication hole configured to be switched between a state in communication with a second auxiliary opening portion and a state out of communication with the second auxiliary opening portion according to the rotational position of the valve body. The second auxiliary communication hole allows the fluid to flow therethrough via a non-contact seal formed between an inner peripheral surface of a valve body containing portion and an outer peripheral surface of a valve body circumferential wall with the main communication hole and the main opening portion in communication with each other and the second auxiliary communication hole and the second auxiliary opening portion out of communication with each other.

According to a third aspect, a cooling system includes a heat exchanger configured to cool down inflowing fluid, a circuit provided so as to extend through the heat exchanger and configured to serve to cool down a heat source by circulating the fluid cooled down at the heat exchanger, and a flow rate control valve configured to control a flow rate of the fluid circulated in the circuit. The flow rate control valve includes a seal member provided between a housing and a valve body and configured to prevent or reduce a leak from a main communication hole or a main opening portion into a space portion. The valve body configured to be rotationally driven by a drive mechanism establishes communication between a first auxiliary communication hole and a first auxiliary opening portion regardless of a rotational position of the valve body, and also changes a communication state between the main communication hole and the main opening portion and a communication state between a second auxiliary communication hole and a second auxiliary opening portion, according to the rotational position of the valve body. A pressure drop is caused due to the space portion on the fluid leaked out into the second auxiliary communication hole via the space portion formed between an inner peripheral surface of a valve body containing portion and an outer peripheral surface of the valve body circumferential wall. An amount of the fluid leaked out into the second auxiliary communication hole is set according to an allowable amount for an apparatus to which the main communication hole is connected with the main communication hole and the main opening portion in communication with each other and the second auxiliary communication hole and the second auxiliary opening portion out of communication with each other.

Therefore, the present invention can reduce the number of seal members in contact with the valve body, thereby

DESCRIPTION OF EMBODIMENTS

First Embodiment

[Configuration of Cooling Water Circuit]

Figure 1:
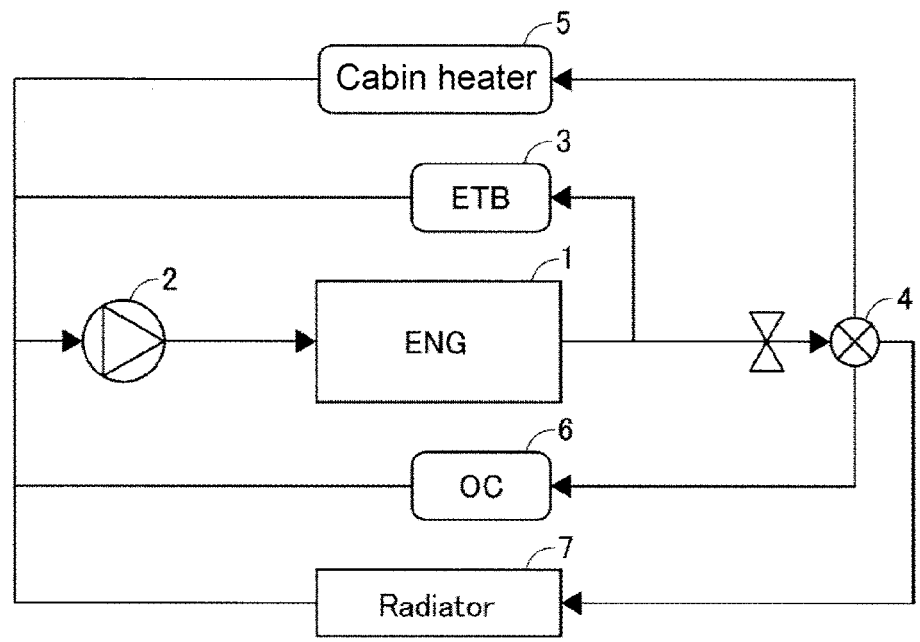
FIG. 1 is a schematic view illustrating a configuration of a circulation circuit of cooling water that cools down an engine according to a first embodiment.

FIG. 1 is a schematic view illustrating a configuration of a circulation circuit of cooling water that cools down an engine 1. Cooling water is pressure-fed into an engine 1 by a pump 2. The cooling water is transmitted to an electronic control throttle body (ETB: Electronic Throttle Body) 3 after cooling down the engine 1. The electronic control throttle body 3 controls a throttle position according to a temperature of the cooling water flowing out of the engine 1. The cooling water is returned to an intake side of the pump 2 after flowing into the electronic control throttle body 3.

The cooling water is transmitted to a mechanical control valve (MCV: Mechanical Control Valve) 4 after flowing out of the engine 1. The mechanical control valve 4 switches a valve state between a completely closed state, a first valve opened state, a second valve opened state, and a completely opened state. In the completely closed state, an entire amount of the cooling water flowing out of the engine 1 is returned to the engine 1. In the first valve opened state, the cooling water is supplied to a cabin heater 5. In the second valve opened state, the cooling water is supplied to an oil cooler (OC) 6 in addition to the cabin heater 5. In the completely opened state, the cooling water is supplied to a radiator 7 in addition to the cabin heater 5 and the oil cooler 6.

The cabin heater 5 is a heat exchanger that heats air in a vehicle compartment to warm the inside of the vehicle compartment. The oil cooler 6 is a heat exchanger that cools down engine oil for use in lubrication in the engine 1. The radiator 7 is a heat exchanger that cools down the cooling water with the aid of, for example, wind generated when a vehicle runs.

[Control Block Diagram]

Figure 2:
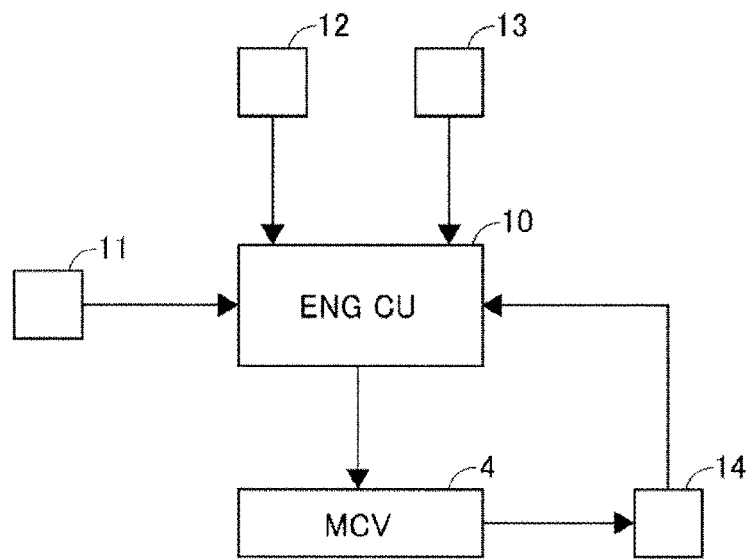
FIG. 2 is a block diagram of control blocks that control a mechanical control valve according to the first embodiment.

FIG. 2 is a block diagram of control blocks that control the mechanical control valve 4. The mechanical control valve 4 performs control of switching the valve state between the above-described completely closed state, first valve opened state, second valve opened state, and completely opened state by an engine control unit 10 that controls the engine 1.

The engine control unit 10 receives an input of temperature information of the cooling water from a water temperature sensor 11 that detects a temperature of the cooling water, which is provided on the electronic control throttle body 3. The water temperature sensor 11 is not limited to the sensor provided on the electronic control throttle body 3 and may be a sensor provided on another location. The engine control unit 10 receives an input of engine load information from an engine load sensor 12. The engine load sensor 12 may be configured to estimate an engine load from an engine negative pressure or the throttle position and output the estimated engine load as the engine load information. The engine control unit 10 receives an input of road surface condition information from a road surface condition determination sensor 13. The road surface condition determination sensor 13 is not especially limited to any kind of sensor, and examples thereof include a sensor that determines a condition of a road surface by irradiating the road surface with an infrared ray or the like, and a sensor that determines the condition of the road surface from a slip rate of a tire or the like.

The engine control unit 10 sets a targeted state of the mechanical control valve 4 (the completely closed state, the first valve opened state, the second valve opened state, and the completely opened state) from the above-described cooling water temperature information, engine load information, and road surface condition information, and the like. The engine control unit 10 controls the mechanical control valve 4 in such a manner that the mechanical control valve 4 satisfies the set targeted state based on angle signal information of an angle sensor 14 provided to the mechanical control valve 4. The angle sensor 14 is provided in the mechanical control valve 4, and detects a rotational position of a valve body 50 in the mechanical control valve 4. The state of the mechanical control valve 4 is switched between the completely closed state, the first valve opened state, the second valve opened state, and the completely opened state according to the rotational position of the valve body 50.

[Configurations of Mechanical Control Valve]

Figure 3:
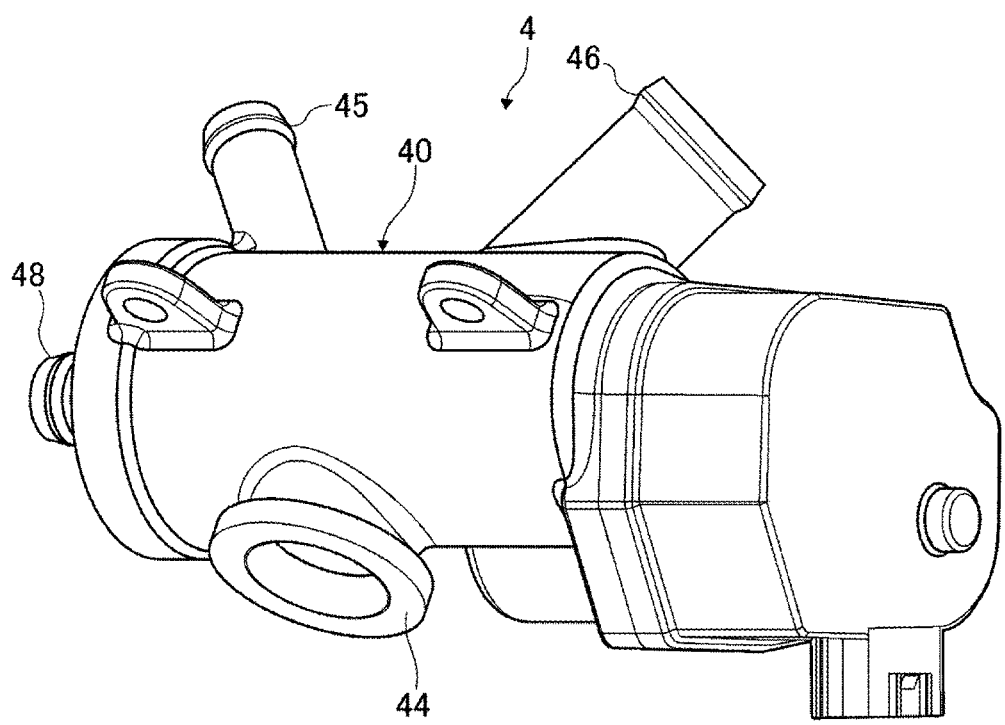
FIG. 3 illustrates an outer appearance of the mechanical control valve according to the first embodiment.
Figure 4:
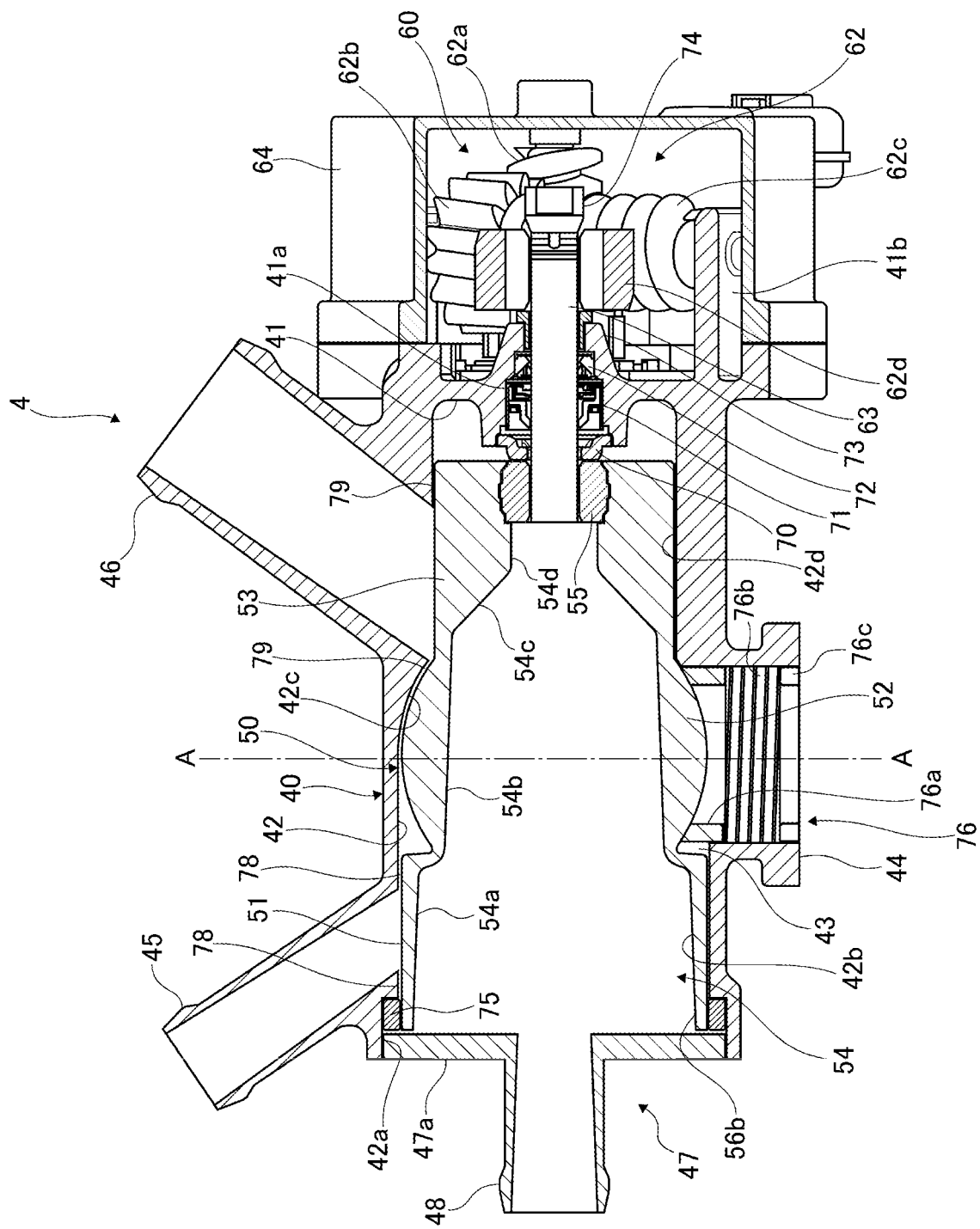
FIG. 4 is a cross-sectional view of the mechanical control valve according to the first embodiment.
Figure 5:
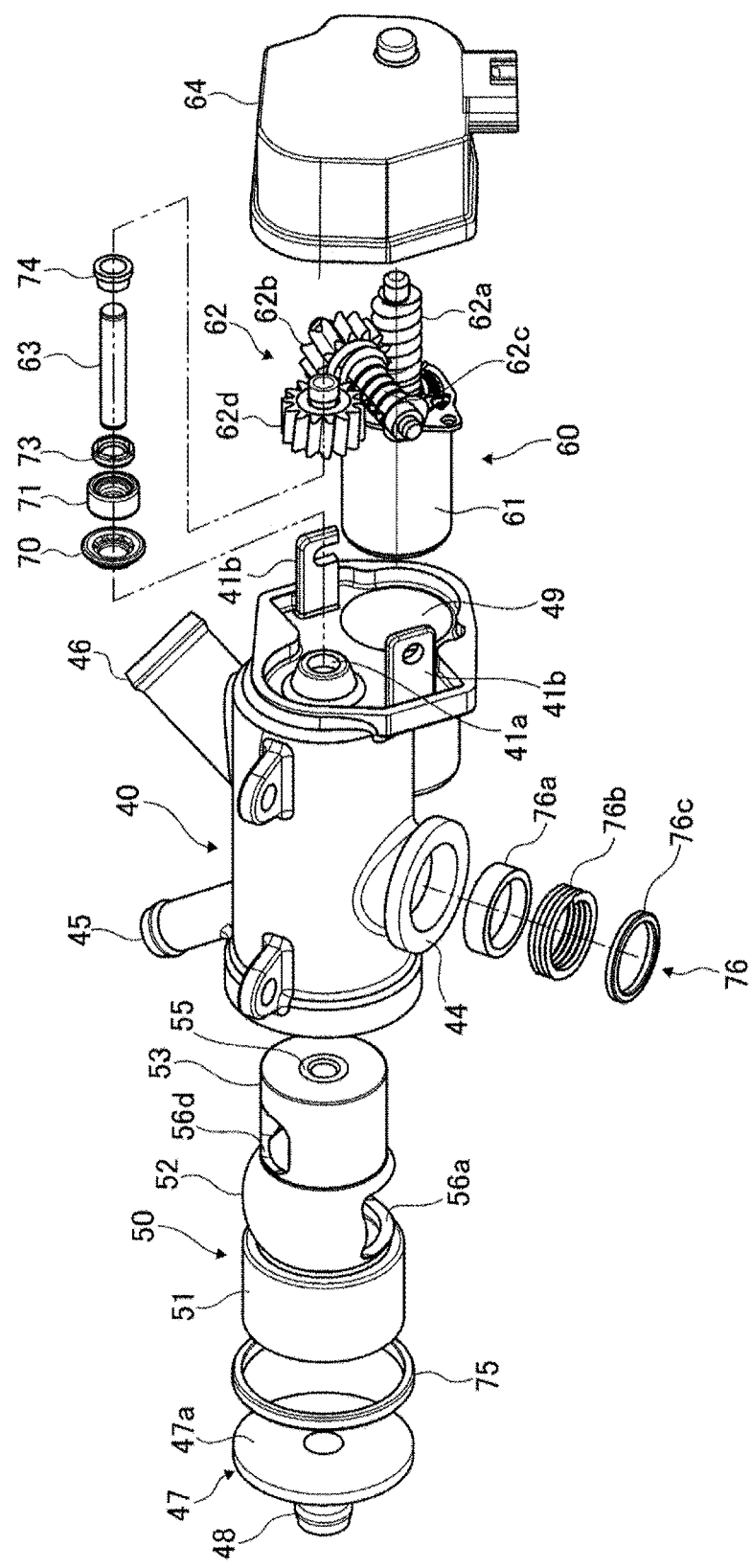
FIG. 5 is an exploded perspective view of the mechanical control valve according to the first embodiment.
Figure 6:
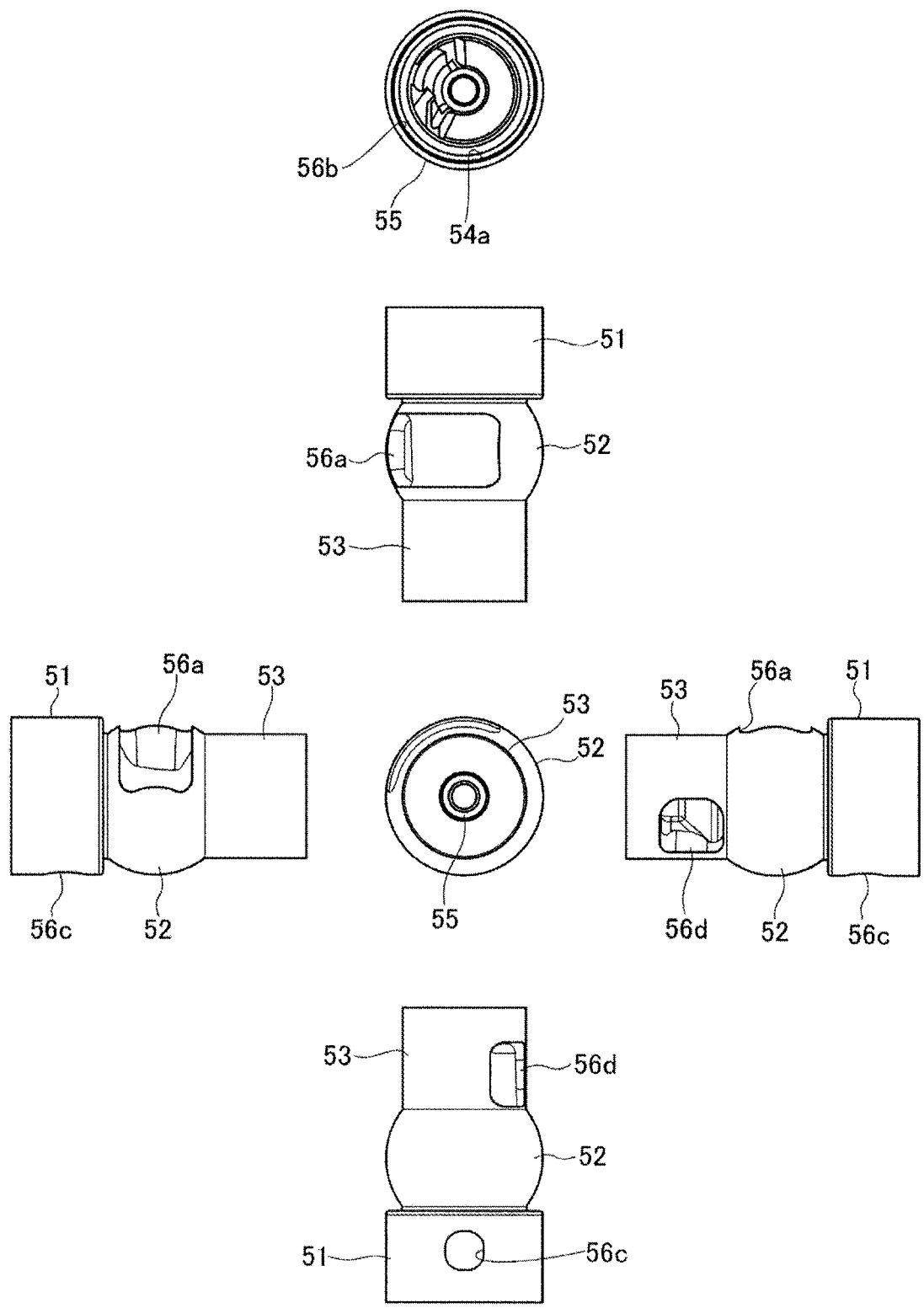
FIG. 6 illustrates a valve body according to the first embodiment.
Figure 7:
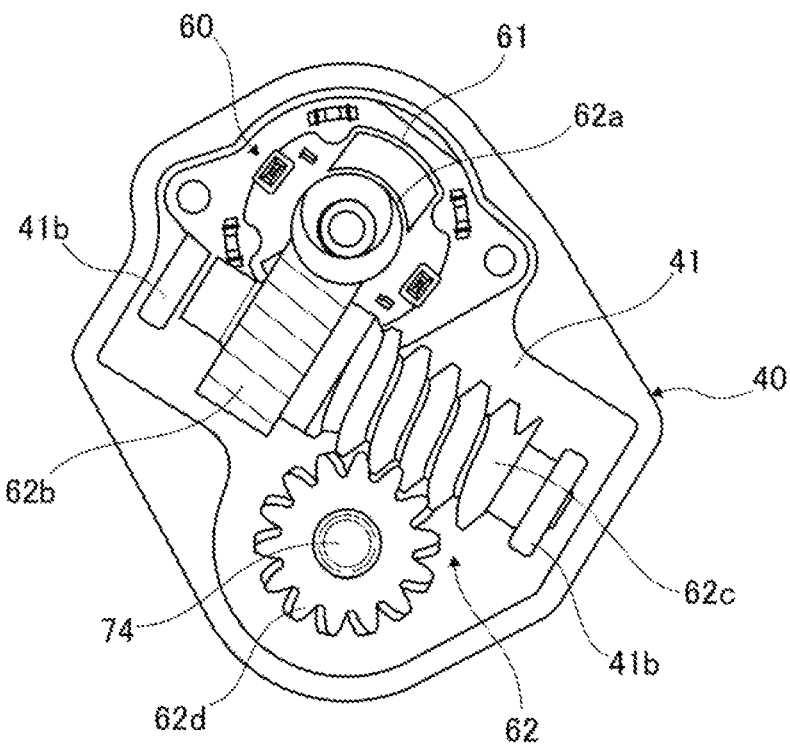
FIG. 7 illustrates a drive mechanism according to the first embodiment.
Figure 8:
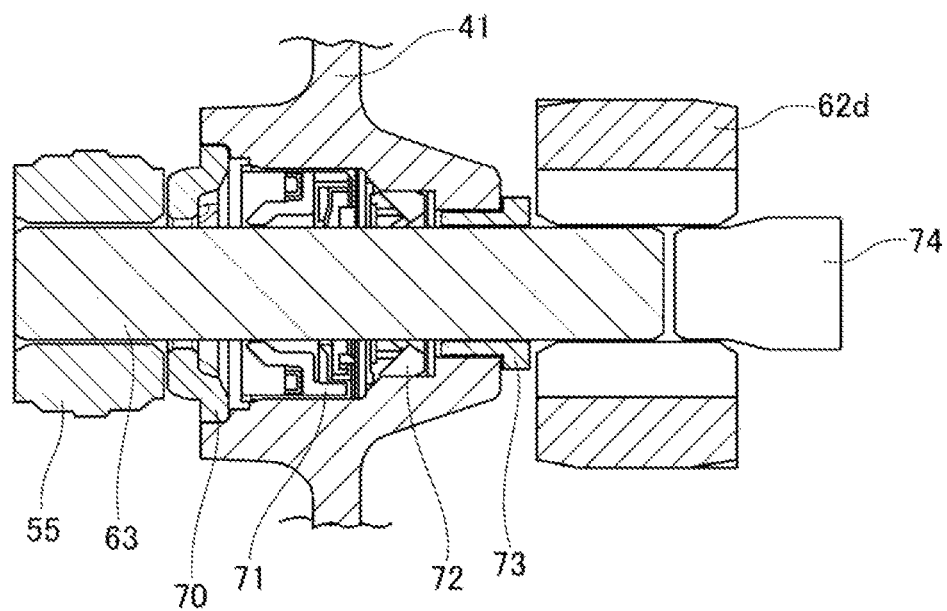
FIG. 8 illustrates a drive shaft and the vicinity thereof according to the first embodiment.

FIG. 3 illustrates an outer appearance of the mechanical control valve 4. FIG. 4 is a cross-sectional view of the mechanical control valve 4. FIG. 5 is an exploded perspective view of the mechanical control valve 4. FIG. 6 illustrates the valve body 50. FIG. 7 illustrates a drive mechanism 60. FIG. 8 illustrates a drive shaft 63 and the vicinity thereof.

The mechanical control valve 4 includes a hollowly formed housing 40, the valve body 50, and the drive mechanism 60. The valve body 50 is rotatably contained in the housing 40. The drive mechanism 60 is provided on one end side of the valve body, and rotationally drives the valve body 50.

(Configuration of Housing)

Now, a configuration of the housing 40 will be described with reference to FIGS. 3, 4, and 5. The housing 40 is, for example, made by casting from an aluminum alloy material. The housing 40 is formed into a generally bottomed cup-like shape. Inside the housing 40, one end side is opened, and the other end side is mostly covered by a bottom portion 41. An insertion hole 41a in communication with the outside is formed on the bottom portion 41. The housing 40 includes a housing circumferential wall, and a valve body containing portion 43 is formed by an inner peripheral surface 42 of this housing circumferential wall and the bottom portion 41.

A main communication hole 44 is provided on an outer peripheral surface of the housing 40. The main communication hole 44 is formed so as to extend in a radial direction of the housing 40. The main communication hole 44 is tubular, and is opened in the valve body containing portion 43. The main communication hole 44 is provided at an approximately central portion in an axial direction of the housing 40. The main communication hole 44 is connected to the engine 1. The cooling liquid flows into the main communication hole 44 after cooling down the engine 1.

A second auxiliary communication hole 45 is provided on the outer peripheral surface of the housing 40. The second auxiliary communication hole 45 is formed so as to extend (obliquely) to tilt toward the one end side (the opening portion side) with respect to the radial direction of the housing 40. The second auxiliary communication hole 45 is tubular, and is opened in the valve body containing portion 43. An opening portion of the second auxiliary communication hole 45 that is opened to the valve body containing portion 43 is provided on one axial end side of the housing 40 with respect to an opening portion of the main communication hole 44 that is opened to the valve body containing portion 43. The second auxiliary communication hole 45 is connected to the oil cooler 6. The cooling water flows out of the second auxiliary communication hole 45 into the oil cooler 6.

A third auxiliary communication hole 46 is provided on the outer peripheral surface of the housing 40. The third auxiliary communication hole 46 is formed so as to extend (obliquely) to tilt toward the other end side (the bottom portion 41 side) with respect to the radial direction of the housing 40. The third auxiliary communication hole 46 is tubular, and is opened in the valve body containing portion 43. An opening portion of the third auxiliary communication hole 46 that is opened to the valve body containing portion 43 is provided on the other axial end side of the housing 40 with respect to the opening portion of the main communication hole 44 that is opened to the valve body containing portion 43. In other words, the second auxiliary communication hole 45 is provided on an opposite side of the main communication hole 44 from the third auxiliary communication hole 46 in the axial direction of the housing 40. The third auxiliary communication hole 46 is connected to the radiator 7. The cooling water flows out of the third auxiliary communication hole 46 into the radiator 7.

An opening end of the inner peripheral surface 42 forms a bearing holding portion 42a. A large-diameter portion 42b is formed at a position located on the inner peripheral surface 42 and adjacent to the bearing holding portion 42a. The housing 40 is formed in such a manner that an inner diameter of the large-diameter portion 42b is smaller than an inner diameter of the bearing holding portion 42a.

A small-diameter portion 42d is formed at a position located on the inner peripheral surface 42 and adjacent to the bottom portion 41. The housing 40 is formed in such a manner that an inner diameter of the small-diameter portion 42d is smaller than the inner diameter of the large-diameter portion 42b. A spherical surface portion 42c is formed on the inner peripheral surface 42 and between the large-diameter portion 42b and the small-diameter portion 42d. The spherical surface portion 42c has an inner peripheral surface formed as a spherical surface.

The opening portion of the valve body containing portion 43 on the one end side is closed by a cover 47 forming the housing circumferential wall after the valve body 50 is contained in the valve body containing portion 43. The cover 47 is, for example, made by casting from an aluminum alloy material. The cover 47 is formed in such a manner that an outer diameter thereof is approximately equal to the inner diameter of the bearing holding portion 42a. The cover 47 is press-fitted in the bearing holding portion 42a. The cover 47 includes a first auxiliary communication hole 48 formed at a central portion of a disk-like cover portion 47a. The first auxiliary communication hole 48 extends outward in the axial direction of the housing 40. The first auxiliary communication hole 48 is connected to the cabin heater 5. The cooling liquid flows out of the first auxiliary communication hole 48 into the cabin heater 5.

A motor containing portion 49 is formed in the housing 40 at a position radially offset with respect to an axial direction of the valve body containing portion 43. The motor containing portion 49 is formed into a bottomed cup-like shape, and the opposite side thereof is opened. The valve body containing portion 43 and the motor containing portion 49 are out of communication with each other, and are separated by a wall.

(Configuration of Valve Body)

Now, a configuration of the valve body 50 will be described with reference to FIGS. 4, 5, and 6. The valve body 50 is contained in the valve body containing portion 43 of the housing 40 rotatably around the axis of the housing 40. The valve body 50 is provided in such a manner that the axial direction of the housing 40 and a direction along a rotational axis of the valve body 50 coincide with each other.

The valve body 50 includes a large-diameter portion 51, a small-diameter portion 53, and a spherical portion 52. The large-diameter portion 51 is disposed on one end side of the valve body containing portion 43. The small-diameter portion 53 is disposed on the other end side of the valve body containing portion 43. The spherical portion 52 is provided between the large-diameter portion 51 and the small-diameter portion 53. A valve body circumferential wall is formed by outer peripheral surfaces of the large-diameter portion 51, the small-diameter portion 53, and the spherical portion 52.

The large-diameter portion 51 is cylindrically formed. The valve body 50 is formed in such a manner that an outer diameter of the large-diameter portion 51 is slightly smaller than the inner diameter of the large-diameter portion 42b of the inner peripheral surface 42 of the housing 40, thereby allowing the valve body 50 to rotate in the valve body containing portion 43. A sliding bearing 75 is held on the bearing holding portion 42a of the housing 40. An inner peripheral surface of the sliding bearing 75 is in contact with the outer peripheral surface of the large-diameter portion 51, and rotatably supports the valve body 50.

The small-diameter portion 53 is cylindrically formed. The valve body 50 is formed in such a manner that an outer diameter of the small-diameter portion 53 is slightly smaller than the inner diameter of the small-diameter portion 42d of the inner peripheral surface 42 of the housing 40, thereby allowing the valve body 50 to rotate in the valve body containing portion 43.

The outer peripheral surface of the spherical portion 52 is mostly formed into a generally spherical shape. The valve body 50 is formed in such a manner that an outer diameter of a spherical surface portion of the spherical portion 52 is slightly smaller than the inner diameter of the spherical surface portion 42c of the inner peripheral surface 42 of the housing 40, thereby allowing the valve body 50 to rotate in the valve body containing portion 43.

The valve body 50 (the valve body circumferential wall) is hollowly formed, and an inside thereof forms a fluid inflow portion 54. The fluid inflow portion 54 includes a large-diameter portion 54a formed at a position overlapping the large-diameter portion 51 in an axial direction of the valve body 50. An intermediate-diameter portion 54b is formed at a position overlapping the spherical portion 52 in the axial direction of the valve body 50. The valve body 50 is formed in such a manner that an inner diameter of the intermediate-diameter portion 54b is smaller than the inner diameter of the large-diameter portion 54a.

A tapered portion 54c is formed at a position adjacent to the intermediate-diameter portion 54b on the other end side in the axial direction of the valve body 50. The valve body 50 is formed in such a manner that an inner diameter of the tapered portion 54c is equal to the inner diameter of the intermediate-diameter portion 54b on one end side and equal to an inner diameter of a small-diameter portion 54d, which will be described below, on the other end side, and gradually reduces from the one end side toward the other end side. The small-diameter portion 54d is formed at a position adjacent to the tapered portion 54c on the other end side in the axial direction of the valve body 50. The valve body 50 is formed in such a manner that the inner diameter of the small-diameter portion 54d is smaller than the inner diameter of the intermediate-diameter portion 54b. A cylindrical seal member 55 is press-fitted in the small-diameter portion 54d.

A main opening portion 56a is formed on a side surface (in a radial direction with respect to the rotational axis of the valve body 50) of the spherical portion 52, which is a part of the valve body circumferential wall. The main opening portion 56a establishes communication between the outside and the fluid inflow portion 54. The main opening portion 56a is in communication with the main communication hole 44 when the rotational position of the valve body 50 is located in a predetermined range. A first auxiliary opening portion 56b is formed by an opening portion of the fluid inflow portion 54 formed inside the valve body circumferential wall on the other end side (an opening portion on the other end side opposite from one end side where the drive mechanism is provided). The first auxiliary opening portion 56b is kept in communication with the first auxiliary communication hole 48 regardless of the rotational position of the valve body 50. A second auxiliary opening portion 56c is formed on a side surface (in the radial direction with respect to the rotational axis of the valve body 50) of the large-diameter portion 51, which is a part of the valve body circumferential wall. The second auxiliary opening portion 56c establishes the communication between the outside and the fluid inflow portion 54. The second auxiliary opening portion 56c is in communication with the second auxiliary communication hole 45 when the rotational position of the valve body 50 is located in a predetermined range. A third auxiliary opening portion 56d is formed on a side surface (in the radial direction with respect to the rotational axis of the valve body 50) of the small-diameter portion 53, which is a part of the valve body circumferential wall. The third auxiliary opening portion 56d establishes the communication between the outside and the fluid inflow portion 54. The third auxiliary opening portion 56d is in communication with the third auxiliary communication hole 46 when the rotational position of the valve body 50 is located in a predetermined range.

(Configuration of Drive Mechanism)

The drive mechanism 60 will be described with reference to FIGS. 4, 5, 7, and 8. The drive mechanism 60 includes a motor 61, a speed reducer 62, and the drive shaft 63.

The motor 61 is an electric motor controlled by the engine control unit 10. The motor 61 is contained in the motor containing portion 49 of the housing 40. A first worm 62a, which forms the speed reducer 62, is provided on an output shaft of the motor 61 integrally rotatably with the output shaft.

The speed reducer 62 includes the first worm 62a, a first worm wheel 62b, a second worm 62c, and a second worm wheel 62d. The first worm 62a is provided integrally rotatably with the output shaft of the motor 61 as described above. The first worm 62a is meshed with the first worm wheel 62b. The first worm wheel 62b and the second worm 62c are formed so as to rotate together. The first worm wheel 62b and the second worm 62c are rotatably supported by two shaft support portions 41b formed so as to extend from the bottom portion 41 of the housing 40 toward the other end side in the axial direction. The second worm 62c is meshed with the second worm wheel 62d. The second worm wheel 62d is provided at a distal end portion of the drive shaft 63 integrally rotatably with the drive shaft 63. The speed reducer 62 is contained in a gear housing 64 formed into a bottomed cup-like shape.

One end portion of the drive shaft 63 (a distal end opposite from a portion where the second worm wheel 62d is mounted) is press-fitted in the seal member 55 of the valve body 50. The drive shaft 63 rotates integrally with the valve body 50. A first bearing 70, a liquid-tight seal 71, and a dust seal 72 are mounted on the drive shaft 63 in this order from the one end side with the one end portion of the drive shaft 63 press-fitted in the seal member 55. The drive shaft 63 is inserted in the insertion hole 41a formed on the bottom portion 41 of the housing 40 with the first bearing 70, the liquid-tight seal 71, and the dust seal 72 mounted on the drive shaft 63. The other end side of the drive shaft 63 penetrates through the insertion hole 41a to protrude to the outside of the housing 40. A second bearing 73 is mounted from the distal end side of the drive shaft 63 protruding to the outside of the housing 40. Due to this configuration, the drive shaft 63 is supported by the first bearing 70 and the second bearing 73 from both ends of the insertion hole 41a in the axial direction. The second worm wheel 62d is mounted on the distal end of the drive shaft 63. A stopper 74 is attached to the distal end of the drive shaft 63 after the second worm wheel 62d is mounted on the drive shaft 63. The second worm wheel 62d is positioned in an axial direction of the drive shaft 63 by the second bearing 73 and the stopper 74.

[Configuration of Seal]

Figure 9:
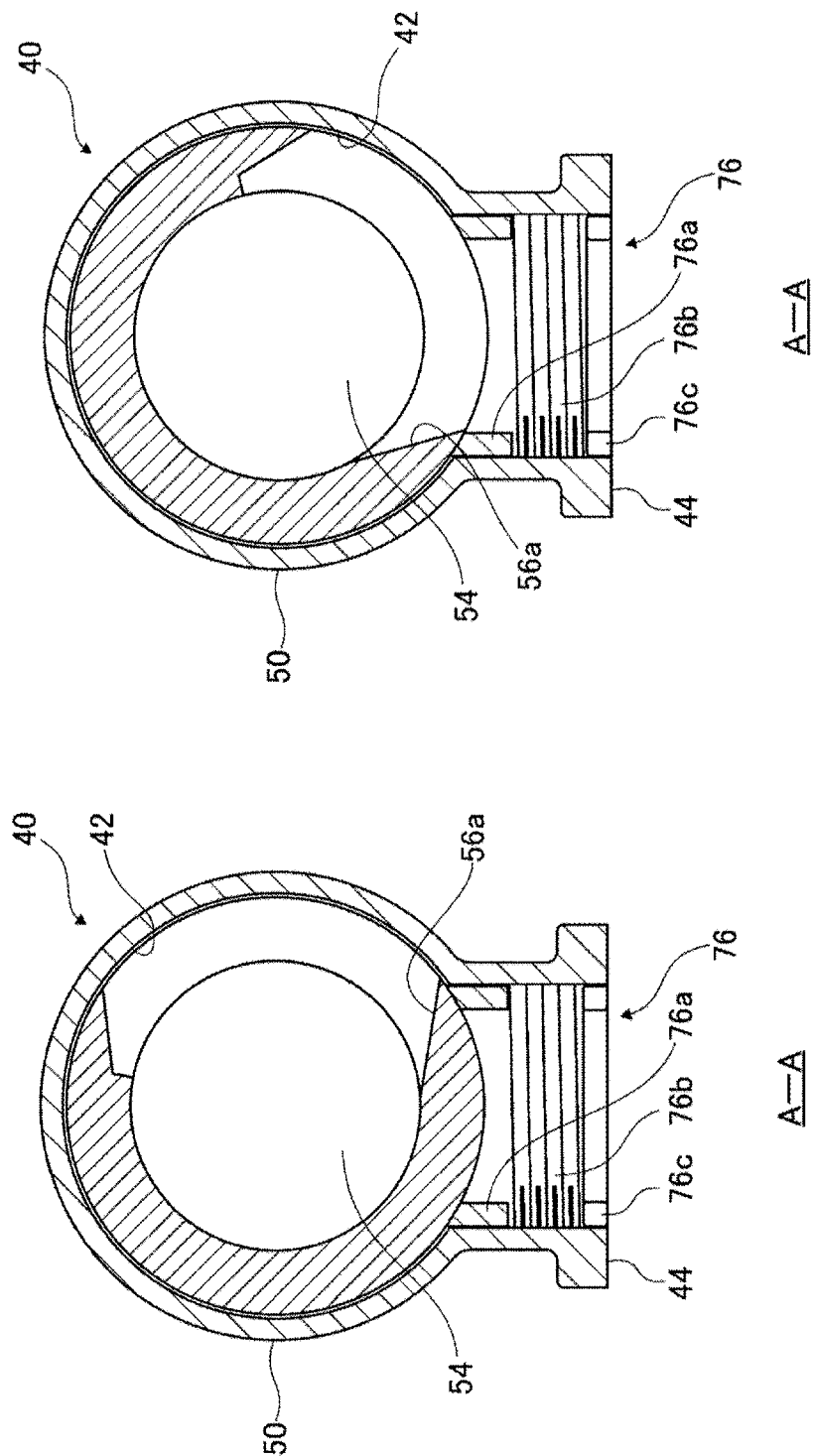
FIG. 9 is cross-sectional views of the mechanical control valve according to the first embodiment.

FIG. 9 is cross-sectional views taken along a line A-A illustrated in FIG. 4. A left-side drawing of FIG. 9 illustrates the cross section with the main communication hole 44 and the main opening portion 56a of the valve body 50 out of communication with each other. A right-side drawing of FIG. 9 illustrates the cross section with the main communication hole 44 and the main opening portion 56a in communication with each other.

A seal member 76 will be described with reference to FIGS. 4, 5, and 9. The seal member 76 is provided inside the main communication hole 44. The seal member 76 includes a seal main body portion 76a, a spring 76b, and a retainer 76c. The seal main body portion 76a is cylindrically formed. A distal end of the seal main body portion 76a is in abutment with the outer peripheral surface of the spherical portion 52 of the valve body 50. The distal end of the seal main body portion 76a is formed into a spherical surface shape along a shape of the outer peripheral surface of the spherical portion 52. The spring 76b is provided in a compressed manner between the seal main body portion 76a and the retainer 76c. The spring 76b biases the seal main body portion 76a toward the valve body 50 side. The retainer 76c is, for example, threadably engaged with the main communication hole 44 and fixed to the main communication hole 44. The cooling water is supposed to flow into the main communication hole 44 from the engine 1 toward the mechanical control valve 4 side. Therefore, a force pressing the seal main body portion 76a against the outer peripheral surface of the valve body 50 is applied due to the cooling water, which contributes to improving a sealing performance.

Configurations of seal portions 78 and 79 will be described with reference to FIG. 4. An extremely small space is provided between the inner peripheral surface 42 around the opening portion of the second auxiliary communication hole 45 that is opened to the valve body containing portion 43, and the outer peripheral surface of the valve body 50. This space forms the seal portion 78. An extremely small space is provided between the inner peripheral surface 42 around the opening portion of the third auxiliary communication hole 46 that is opened to the valve body containing portion 43, and the outer peripheral surface of the valve body 50. This space forms the seal portion 79.

When the cooling water flows into the fluid inflow portion 54 of the valve body 50, the cooling water also flows into between the outer peripheral surface of the valve body 50 and the inner peripheral surface 42 of the housing 40. At this time, the cooling water may be leaked out into the second auxiliary communication hole 45 or the third auxiliary communication hole 46 by passing through the seal portion 78 or 79 even when the second auxiliary communication hole 45 and the opening portion 56c of the valve body 50, or the third auxiliary communication hole 46 and the opening portion 56d are out of communication with each other. An amount of the leaked cooling water is managed by a pressure drop caused on the cooling water by the seal portion 78 or 79. The pressure drop is adjusted according to a length of the seal portion 78 or 79 (the space) in the axial direction of the housing 40 (the direction along the rotational axis of the valve body 50). The pressure drop is set according to a reduction in a speed at which the temperature increases due to the leak of the cooling water that is allowable on the engine 1 side. The seal portions 78 and 79 are arranged in such a manner that the pressure drop caused on the cooling water by the seal portion 79 is larger than the pressure drop caused on the cooling water by the seal portion 78.

[Operation State of Mechanical Control Valve]

Figure 10:
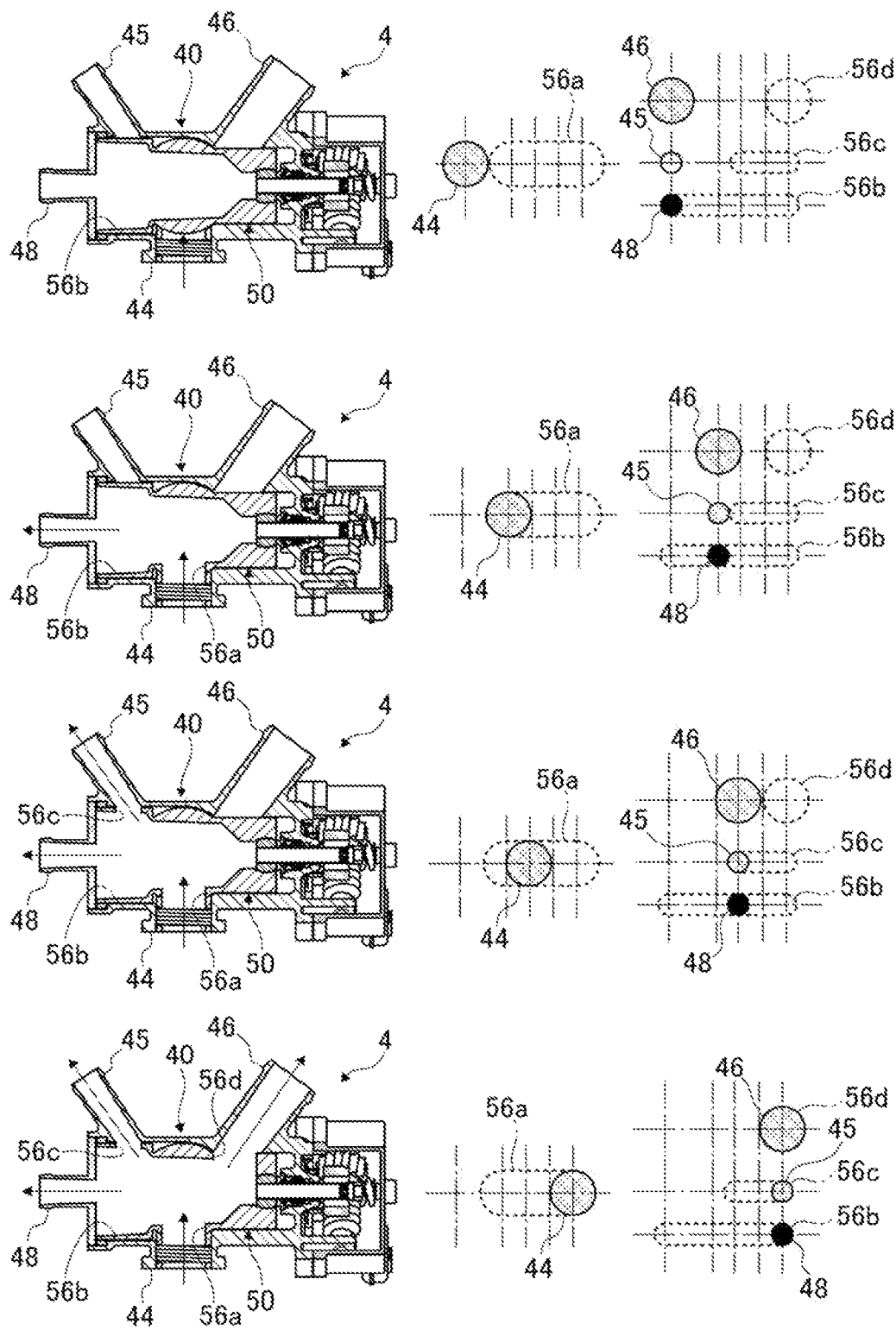
FIG. 10 illustrates operation states of the mechanical control valve according to the first embodiment.

FIG. 10 illustrates operation states of the mechanical control valve 4. Left-side drawings are cross-sectional views illustrating the individual operation states of the mechanical control valve 4. Right-side drawings are schematic views illustrating respective communication states between the main communication hole 44 and the individual auxiliary communication holes 48, 45, and 46, and the opening portions 56a to 56d. Further, the first row illustrates the operation state when the mechanical control valve 4 is in the completely closed state. The second row illustrates the operation state when the mechanical control valve 4 is in the first valve opened state. The third row illustrates the operation state when the mechanical control valve 4 is in the second valve opened state. Further, the fourth row illustrates the operation state when the mechanical control valve 4 is in the completely opened state.

The reference numerals are partially omitted in the left-side cross-sectional views of the mechanical control valve 4. Further, in the right-side schematic views illustrating the respective communication states between the main communication hole 44 and the individual auxiliary communication holes 48, 45, and 46, and the opening portions 56a to 56d, the main communication hole 44 and the individual auxiliary communication holes 48, 45, and 46 illustrated in a hatched manner indicate that they are out of communication with the opening portions 56a to 56d, respectively. Further, in these drawings, the main communication hole 44 and the individual auxiliary communication holes 48, 45, and 46 illustrated in black indicate that they are in communication with the opening portions 56a to 56d, respectively.

As illustrated in the first to fourth rows of FIG. 10, the first auxiliary communication hole 48 is in communication with the first auxiliary opening portion 56b regardless of which state the mechanical control valve 4 is in.

When the mechanical control valve 4 is in the completely closed state, the main communication hole 44 and the main opening portion 56a, the second auxiliary communication hole 45 and the opening portion 56c, and the third auxiliary communication hole 46 and the opening portion 56d are out of communication with each other, as illustrated in the first row of FIG. 10. The cooling water flowing in from the engine 1 does not flow out into the cabin heater 5, the oil cooler 6, and the radiator 7 as the circuit is blocked by the outer peripheral surface of the valve body 50 and the seal member 76 in the main communication hole 44.

When the mechanical control valve 4 is in the first valve opened state, the main communication hole 44 and the main opening portion 56a are in communication with each other while the second auxiliary communication hole 45 and the opening portion 56c, and the third auxiliary communication hole 46 and the opening portion 56d are out of communication with each other, as illustrated in the second row of FIG. 10. The cooling water flowing in from the engine 1 flows in from the main communication hole 44 to the fluid inflow portion 54 of the valve body 50, and flows out of the first auxiliary communication hole 48 into the cabin heater 5. The cooling water flowing into the fluid inflow portion 54 at this time is partially leaked out into the second auxiliary communication hole 45 and the third auxiliary communication hole 46, but an amount thereof is extremely small compared to an amount of the cooling water flowing out of the first auxiliary communication hole 48.

When the mechanical control valve 4 is in the second valve opened state, the main communication hole 44 and the main opening portion 56a, and the second auxiliary communication hole 45 and the opening portion 56c are in communication with each other while the third auxiliary communication hole 46 and the opening portion 56*d* are out of communication with each other, as illustrated in the third row of FIG. 10. The cooling water flowing in from the engine 1 flows in from the main communication hole 44 to the fluid inflow portion 54 of the valve body 50, and flows out of the first auxiliary communication hole 48 and the second auxiliary communication hole 45 into the cabin heater 5 and the oil cooler 6, respectively. The cooling water flowing into the fluid inflow portion 54 at this time is partially leaked out into the third auxiliary communication hole 46, but an amount thereof is extremely small compared to an amount of the cooling water flowing out of the first auxiliary communication hole 48 and the second auxiliary communication hole 45.

When the mechanical control valve 4 is in the second valve opened state, the main communication hole 44 and the main opening portion 56*a*, the second auxiliary communication hole 45 and the opening portion 56*c*, and the third auxiliary communication hole 46 and the opening portion 56*d* are in communication with each other, as illustrated in the fourth row of FIG. 10. The cooling water flowing in from the engine 1 flows in from the main communication hole 44 to the fluid inflow portion 54 of the valve body 50, and flows out of the first auxiliary communication hole 48, the second auxiliary communication hole 45, and the third auxiliary communication hole 46 into the cabin heater 5, the oil cooler 6, and the radiator 7, respectively.

[Functions]

A seal should be provided between the main communication hole 44, the second auxiliary communication hole 45, and the third auxiliary communication hole, and the valve body 50. However, if a structure sealing therebetween by contacting the outer peripheral surface of the valve body 50, like the seal member 76 according to the first embodiment, is provided between all of the main communication hole 44, the second auxiliary communication hole 45, and the third auxiliary communication hole 46, and the valve body 50, excessive friction would be generated when the valve body 50 is rotated. Therefore, this configuration brings a concern that the size of the drive mechanism 60 increases.

Therefore, in the first embodiment, the seal member 76, which is in contact with the outer peripheral surface of the valve body 50, is provided only between the main communication hole 44 and the valve body 50. On the other hand, the seal portions 78 and 79, each of which functions as the seal by causing the pressure drop on the cooling water, are provided between the second auxiliary communication hole 45 and the third auxiliary communication hole 46, and the valve body 50. Due to this configuration, the mechanical control valve 4 can reduce the number of seal members in contact with the valve body 50, thereby reducing the friction when the valve body 50 is rotated. Therefore, the mechanical control valve 4 can achieve a reduction in the size of the drive mechanism 60.

When the temperature of the engine 1 is low, the mechanical control valve 4 is controlled into the completely closed state. The circulation circuit is configured to prevent or cut down a reduction in the temperature of the cooling water by prohibiting the cooling water from flowing out of the engine 1 into the cabin heater 5, the oil cooler 6, and the radiator 7 with use of the mechanical control valve 4. The leak of the cooling water from between the main communication hole 44 and the valve body 50 considerably affects the speed at which the temperature of the engine 1 increases, so that the amount of the leaked cooling water should be reduced as much as possible. Therefore, the mechanical control valve 4 includes the seal member 76 provided between the main communication hole 44 and the valve body 50, thereby reducing the leak of the cooling water from between the main communication hole 44 and the valve body 50 as much as possible.

When the temperature of the engine 1 increases to some degree (for example, the temperature of the cooling water increases to approximately 60 degrees Celsius), the mechanical control valve 4 is controlled into the first valve opened state. At this time, the cooling water flows out of the engine 1 into the cabin heater 5 due to the mechanical control valve 4. The cabin heater 5 carries out a heat exchange between the air in the vehicle compartment and the cooling water, thereby warming the inside of the vehicle compartment. At this time, even if a small amount of the cooling water is leaked out from between the second auxiliary communication hole 45 or the third auxiliary communication hole 46 and the valve body 50, the leak of the cooling water does not considerably affect the increase in the temperature of the engine 1 because the vehicle is already in a state that the cooling water flows out to the first auxiliary communication hole 48 side.

Therefore, the seal portions 78 and 79, each of which is formed with use of the space between the inner peripheral surface 42 of the housing 40 and the outer peripheral surface of the valve body 50, are provided between the second auxiliary communication hole 45 and the third auxiliary communication hole 46. The seal portions 78 and 79 allow the leak of the cooling water. However, the fluid inflow portion 54 of the valve body 50 is in communication with the first auxiliary communication hole 48, so that the pressure of the cooling water is not large in the fluid inflow portion 54, which contributes to limiting the amount of the cooling water leaked from the seal portions 78 and 79 to just a small amount.

Further, in the first embodiment, the pressure drop caused on the cooling water at each of the seal portions 78 and 79 is set according to the length of the space forming the seal portion 78 or 79 in the direction along the rotational axis of the valve body 50. The pressure drop caused on the cooling water at each of the seal portions 78 and 79 is set according to the reduction in the speed at which the temperature increases due to the leak of the cooling water that is allowable on the engine 1 side. This configuration allows the pressure drop to be easily set by utilizing the length of the space forming the seal portion 78 or 79.

Further, in the first embodiment, the mechanical control valve 4 is configured to omit a space corresponding to the seal portions 78 and 79 between the first auxiliary communication hole 48 and the valve body 50. The first auxiliary communication hole 48 is constantly in communication with the first auxiliary opening portion 56*b*, so that the provision of the seal is unnecessary between the first auxiliary communication hole 48 and the valve body 50. The mechanical control valve 4 allows the cooling water to flow out of the first auxiliary communication hole 48 without unnecessarily causing the pressure drop on the cooling water.

Further, in the first embodiment, the mechanical control valve 4 is configured in such a manner that the first auxiliary communication hole 48 is connected to the cabin heater 5. When the temperature of the engine 1 increases to some degree, the inside of the vehicle compartment can be warmed quickly because the cabin heater 5 is connected to the first auxiliary communication hole 48, which is brought into communication with the first communication hole 44 first.

Further, in the first embodiment, when the mechanical control valve 4 is in the first valve opened state, the main communication hole 44 and the second auxiliary communication hole 45 are in communication with each other via the seal portion 78, and the main communication hole 44 and the third auxiliary communication hole 46 are also in communication with each other via the seal portion 79. The cooling water traveling from the main communication hole 44 to the second auxiliary communication hole 45 and the third auxiliary communication hole 46 is subjected to the pressure drop by the seal portions 78 and 79. Therefore, the mechanical control valve 4 can allow the cooling water to be little leaked out into the second auxiliary communication hole 45 and the third auxiliary communication hole 46, thereby preventing or cutting down the reduction in the temperature of the cooling water.

Further, in the first embodiment, the oil cooler 6 is connected to the second auxiliary communication hole 45 and the radiator 7 is connected to the third auxiliary communication hole 46. The oil cooler 6 and the radiator 7 are respectively connected to the second auxiliary communication hole 45 and the third auxiliary communication hole 46 into which the cooling water is little leaked out when the mechanical control valve 4 is in the first valve opened state. Therefore, when being in the first valve opened state, the mechanical control valve 4 can allow the cooling water to little flow out into the oil cooler 6 and the radiator 7 each having a high cooling performance, thereby preventing or cutting down the reduction in the temperature of the cooling water.

Further, in the first embodiment, the pressure drop caused on the cooling water by the seal portion 79 is larger than the pressure drop caused on the cooling water by the seal portion 78. Due to this configuration, when being in the first valve opened state, the mechanical control valve 4 allows the cooling water to flow out to the radiator 7 by a smaller amount than the amount of the cooling water flowing out into the oil cooler 6. The mechanical control valve 4 can reduce the amount of the cooling water flowing out to the radiator 7 having a high performance of cooling the cooling water, thereby preventing or cutting down the reduction in the temperature of the cooling water.

Further, in the first embodiment, the main communication hole 44 is provided at the approximately central portion in the axial direction of the housing 40. Due to this configuration, the mechanical control valve 4 can allow the first auxiliary communication hole 48, the second auxiliary communication hole 45, and the third auxiliary communication hole 46 to be located approximately equal distance away from the main communication hole 44, thereby achieving approximately even supply of the cooling water from the main communication hole 44 to each of the auxiliary communication holes 45, 46, and 48.

Further, in the first embodiment, the second auxiliary communication hole 45 is provided on the opposite side of the main communication hole 44 from the third auxiliary communication hole 46 in the axial direction of the housing 40. Due to this configuration, the mechanical control valve 4 can allow the first auxiliary communication hole 48, the second auxiliary communication hole 45, and the third auxiliary communication hole 46 to be located approximately equal distance away from the main communication hole 44, thereby achieving approximately even supply of the cooling water from the main communication hole 44 to each of the auxiliary communication holes 45, 46, and 48.

Further, in the first embodiment, the drive shaft 63 is supported by the first bearing 70 and the second bearing 73 from the both axial ends of the insertion hole 41a of the bottom portion 41 of the housing 40. Due to this configuration, the drive shaft 63 can be stably supported.

Advantageous Effects

In the following, advantageous effects of the first embodiment will be described.

(1) The mechanical control valve 4 includes the housing 40. The housing 40 includes the hollowly formed valve body containing portion 43, the main communication hole 44 configured to establish the communication between the valve body containing portion 43 and the outside and configured to allow the fluid to flow therethrough, the first auxiliary communication hole 48 configured to establish the communication between the valve body containing portion 43 and the outside and configured to allow the fluid to flow therethrough, and the second auxiliary communication hole 45 configured to establish the communication between the valve body containing portion 43 and the outside and configured to allow the fluid to flow therethrough. The mechanical control valve 4 further includes the valve body 50. The valve body 50 includes the hollowly formed fluid inflow portion 54, and the plurality of opening portions 56 configured to establish the communication between the fluid inflow portion 54 and the outside. The valve body 50 is rotatably disposed in the valve body containing portion 43. The mechanical control valve 4 further includes the drive mechanism 60 configured to rotationally drive the valve body 50, and the seal member 76 provided between the main communication hole 44 and the valve body 50 and configured to seal between the housing 40 and the valve body 50. The valve body 50 constantly establishes the communication between the first auxiliary communication hole 48 and the first auxiliary opening portion 56b regardless of the rotational position, and also changes the respective communication states between the main communication hole 44 and the main opening portion 56a and between the second auxiliary communication hole 45 and the second auxiliary opening portion 56c according to the rotational position. The pressure drop is caused on the cooling water (fluid) leaked out from the outer peripheral surface of the valve body 50 into the second auxiliary communication hole 45 due to the space formed between the valve body containing portion 43 and the valve body 50. For the pressure drop, the amount of the fluid leaked out into the second auxiliary communication hole 45 is set according to the allowable amount for the engine 1 (an apparatus) to which the main communication hole 44 is connected, with the main communication hole 44 and the main opening portion 56a in communication with each other and the second auxiliary communication hole 45 and the opening portion 56c out of communication with each other.

Due to this configuration, the mechanical control valve 4 can reduce the number of seal members in contact with the valve body 50, thereby reducing the friction when the valve body 50 is rotated. Therefore, this configuration can achieve the reduction in the size of the drive mechanism 60.

(2) The pressure drop is set according the length of the portion extending in the direction along the rotational axis of the valve body 50 in the length of the seal portion 78 or 78 (the space portion) formed between the inner peripheral surface 42 of the valve body containing portion 43 and the outer peripheral surface of the valve body 50.

Due to this configuration, the pressure drop can be easily set.

(3) The main communication hole 44 and the first auxiliary communication hole 48 are in communication with each other without the intervention of the seal portion (the space portion) formed between the inner peripheral surface of the valve body containing portion 43 and the outer peripheral surface of the valve body 50 when the main communication hole 44 and the main opening portion 56a are in communication with each other.

Due to this configuration, the mechanical control valve 4 can allow the cooling water to flow out of the first auxiliary communication hole 48 without unnecessarily causing the pressure drop on the cooling water.

(4) The first auxiliary communication hole 48 is connected to the cabin heater 5 (a heat exchanger for a heater) to be used to warm the inside of the vehicle compartment.

Due to this configuration, the inside of the vehicle compartment can be warmed quickly.

(5) The main communication hole 44 and the second auxiliary communication hole 45 are in communication with each other via the seal portion 78 (the space portion) formed between the inner peripheral surface 42 of the valve body containing portion 43 and the outer peripheral surface of the valve body 50 when the main communication hole 44 and the main opening portion 56a are in communication with each other and the second auxiliary communication hole 45 and the second auxiliary opening portion 56c are out of communication with each other.

Due to this configuration, when being in the first valve opened state, the mechanical control valve 4 can allow the cooling water to be little leaked out into the second auxiliary communication hole 45, thereby preventing or cutting down the reduction in the temperature of the cooling water.

(6) The fluid is used to cool down the engine 1. The second auxiliary communication hole 45 is connected to the oil cooler 6 configured to cool down the engine oil for use in the lubrication in the engine 1.

Due to this configuration, when being in the first valve opened state, the mechanical control valve 4 can allow the cooling water to be little leaked out into the oil cooler 6, thereby preventing or cutting down the reduction in the temperature of the cooling water.

(7) The housing 40 includes the third auxiliary communication hole 46 configured to establish the communication between the valve body containing portion 43 and the outside and configured to allow the fluid to flow therethrough. The valve body 50 changes the communication state between the third auxiliary communication hole 46 and the opening portion 56d according to the rotational position. The main communication hole 44 and the first auxiliary communication hole 48 are in communication with each other without the intervention of the seal portion (the space portion) formed between the inner peripheral surface 42 of the valve body containing portion 43 and the outer peripheral surface of the valve body 50 when the main communication hole 44 and the main opening portion 56a are in communication with each other. The main communication hole 44 and the second auxiliary communication hole 45 are in communication with each other via the seal portion 78 (the space portion) formed between the inner peripheral surface 42 of the valve body containing portion 43 and the outer peripheral surface of the valve body 50 when the main communication hole 44 and the main opening portion 56a are in communication with each other and the second auxiliary communication hole 45 and the opening portion 56c are out of communication with each other. The main communication hole 44 and the third auxiliary communication hole 46 are in communication with each other via the seal portion 79 (the space portion) formed between the inner peripheral surface 42 of the valve body containing portion 43 and the outer peripheral surface of the valve body 50 when the main communication hole 44 and the main opening portion 56a are in communication with each other and the third auxiliary communication hole 46 and the opening portion 56d are out of communication with each other. The pressure drop at the seal portion 79 (the space portion) between the main communication hole 44 and the third auxiliary communication hole 46 is larger than the pressure drop at the seal portion 78 (the space portion) between the main communication hole 44 and the second auxiliary communication hole 45.

Due to this configuration, when being in the first valve opened state, the mechanical control valve 4 can allow the cooling water to be little leaked out into the oil cooler 6 and the radiator 7 each having the high cooling performance, thereby preventing or cutting down the reduction in the temperature of the cooling water.

(8) The oil cooler 6 configured to cool down the engine oil for use in the lubrication in the engine 1 is connected to the second auxiliary communication hole 45. The radiator 7 configured to cool down the fluid is connected to the third auxiliary communication hole 46.

Due to this configuration, when being in the first valve opened state, the mechanical control valve 4 allows the cooling water to flow out to the radiator 7 by a smaller amount than the amount of the cooling water flowing out into the oil cooler 6. The mechanical control valve 4 can reduce the amount of the cooling water flowing out to the radiator 7 having the high performance of cooling the cooling water, thereby preventing or cutting down the reduction in the temperature of the cooling water.

(9) The main communication hole 44 is provided at the axially central portion of the housing 40 in the direction along the rotational axis of the valve body 50.

Due to this configuration, the mechanical control valve 4 can allow the second auxiliary communication hole 45 and the third auxiliary communication hole 46 to be located approximately equal distance away from the main communication hole 44, thereby achieving approximately even supply of the cooling water from the main communication hole 44 to each of the auxiliary communication holes 45, 46, and 48.

(10) The housing 40 includes the third auxiliary communication hole 46 configured to establish the communication between the valve body containing portion 43 and the outside and configured to allow the fluid to flow therethrough. The second auxiliary communication hole 45 is provided on the opposite side of the main communication hole 44 from the third auxiliary communication hole 46 in the direction along the rotational axis of the valve body 50.

Due to this configuration, the mechanical control valve 4 can allow the second auxiliary communication hole 45 and the third auxiliary communication hole 46 to be located approximately equal distance away from the main communication hole 44, thereby achieving approximately even supply of the cooling water from the main communication hole 44 to each of the auxiliary communication holes 45, 46, and 48.

(11) The drive mechanism 60 includes the drive shaft 63 configured to rotate integrally with the valve body 50, the insertion hole 41a configured to penetrate through the bottom portion 41 of the valve body containing portion 43 and configured to allow the drive shaft 63 to be inserted therethrough, and the first bearing 70 and the second bearing 73

(a support member) configured to rotatably support the drive shaft 63 at each of the both axial ends of the insertion hole 41a.

Due to this configuration, the drive shaft 63 can be stably supported.

(12) The mechanical control valve 4 includes the housing 40. The housing 40 includes the hollowly formed valve body containing portion 43, the main communication hole 44 configured to establish the communication between the valve body containing portion 43 and the outside and configured to allow the fluid cooling down the engine 1 (a heat source) to flow therein, and the plurality of auxiliary communication holes 45 and 48 configured to distribute the fluid flowing in from the main communication hole 44 to the heat exchanger. The mechanical control valve 4 further includes the valve body 50. The valve body 50 includes the hollowly formed fluid inflow portion 54 and the plurality of opening portions 56 configured to establish the communication between the fluid inflow portion 54 and the outside. The valve body 50 is rotatably disposed in the valve body containing portion 43. The mechanical control valve 4 further includes the seal member 76 (a contact seal member) provided between the main communication hole 44 and the valve body 50 and configured to seal between the valve body 50 and the housing 40 by abutting against the outer peripheral surface of the valve body 50. The valve body 50 changes the respective communication states between the main communication hole 44 and the auxiliary communication holes 45 and 48 and the opening holes 56 according to the rotational position. The auxiliary communication holes 45 and 48 include the first auxiliary communication hole 48 constantly in communication with the first auxiliary opening portion 56b, and the second auxiliary communication hole 45 configured to be switched between the state in communication with the opening portion 56c and the state out of communication with the opening portion 56c according to the rotational position of the valve body 50. The second auxiliary communication hole 45 allows the cooling water (the fluid) to flow therethrough via the seal portion 78 (a non-contact seal) formed between the inner peripheral surface 42 of the valve body containing portion 43 and the outer peripheral surface of the valve body 50, with the main communication hole 44 and the main opening portion 56a in communication with each other and the second auxiliary communication hole 45 and the opening portion 56c out of communication with each other.

Due to this configuration, the mechanical control valve 4 can reduce the number of seal members in contact with the valve body 50, thereby reducing the friction when the valve body 50 is rotated. Therefore, this configuration can achieve the reduction in the size of the drive mechanism 60.

(13) The cooling system includes the radiator 7 (a heat exchanger) configured to cool down the inflowing fluid, the circuit provided so as to extend through the radiator 7 (the heat exchanger) and configured to serve to cool down the heat source by circulating the cooling water (fluid) cooled down at the radiator 7 (the heat exchanger), and the mechanical control valve 4 (a flow rate control valve) configured to control the flow rate of the cooling water (the fluid) circulated in the circuit. The mechanical control valve 4 (the flow rate control valve) includes the housing 40. The housing 40 includes the hollowly formed valve body containing portion 43, the main communication hole 44 connected to the heat source and configured to establish the communication between the valve body containing portion 43 and the outside and allow the fluid to flow therethrough, the first auxiliary communication hole 48 configured to establish the communication between the valve body containing portion 43 and the outside and configured to allow the fluid to flow therethrough, and the second auxiliary communication hole 45 configured to establish the communication between the valve body containing portion 43 and the outside and configured to allow the fluid to flow therethrough. The mechanical control valve 4 further includes the valve body 50. The valve body 50 includes the hollowly formed fluid inflow portion 54 and the plurality of opening portions 56 configured to establish the communication between the fluid inflow portion 54 and the outside. The valve body 50 is rotatably disposed in the valve body containing portion 43. The mechanical control valve 4 further includes the drive mechanism 60 configured to rotationally drive the valve body 50, and the seal member 76 provided between the main communication hole 44 and the valve body 50 and configured to seal between the housing 40 and the valve body 50. The valve body 50 constantly establishes the communication between the first auxiliary communication hole 48 and the first auxiliary opening portion 56b regardless of the rotational position, and also changes the respective communication states between the main communication hole 44 and the second auxiliary communication hole 45 and the opening portions 56a and 56c according to the rotational position. The pressure drop is caused on the cooling water (the fluid) leaked out from the outer peripheral surface of the valve body 50 into the second auxiliary communication hole 45 due to the space formed between the valve body containing portion 43 and the valve body 50. For the pressure drop, the amount of the fluid leaked out into the second auxiliary communication hole 45 is set according to the allowable amount for the apparatus to which the main communication hole 44 is connected, with the main communication hole 44 and the main opening portion 56a in communication with each other and the second auxiliary communication hole 45 and the opening portion 56c out of communication with each other.

Due to this configuration, the cooling system can reduce the number of seal members in contact with the valve body 50, thereby reducing the friction when the valve body 50 is rotated. Therefore, this configuration can achieve the reduction in the size of the drive mechanism 60.

(14) The circuit is formed as the cooling circuit for the engine 1 (the internal combustion engine). The cooling circuit is configured to serve to cool down the engine 1 (the internal combustion engine) by causing the cooling water (the fluid) pressure-fed by the pump 2 to flow in the engine 1 (the internal combustion engine). The pump 2 is connected to the engine 1 (the internal combustion engine) that is the heat source, and disposed on one side where the fluid is supplied to the engine 1 (the internal combustion engine). The main communication hole 44 is connected to the discharge side of the pump 2 in the circuit.

Due to this configuration, the cooling system can be applied to such a type of system that the mechanical control valve 4 is disposed on the discharge side of the pump 2.

Second Embodiment

In a second embodiment, the outer diameter of the valve body 50 is modified. Further, in the second embodiment, the configuration of the seal portion 78 is partially modified. In the following description, a configuration of the mechanical control valve 4 according to the second embodiment will be described, but a similar configuration to the first embodiment will be identified by the same reference numeral and a description thereof will be omitted.

Figure 11:
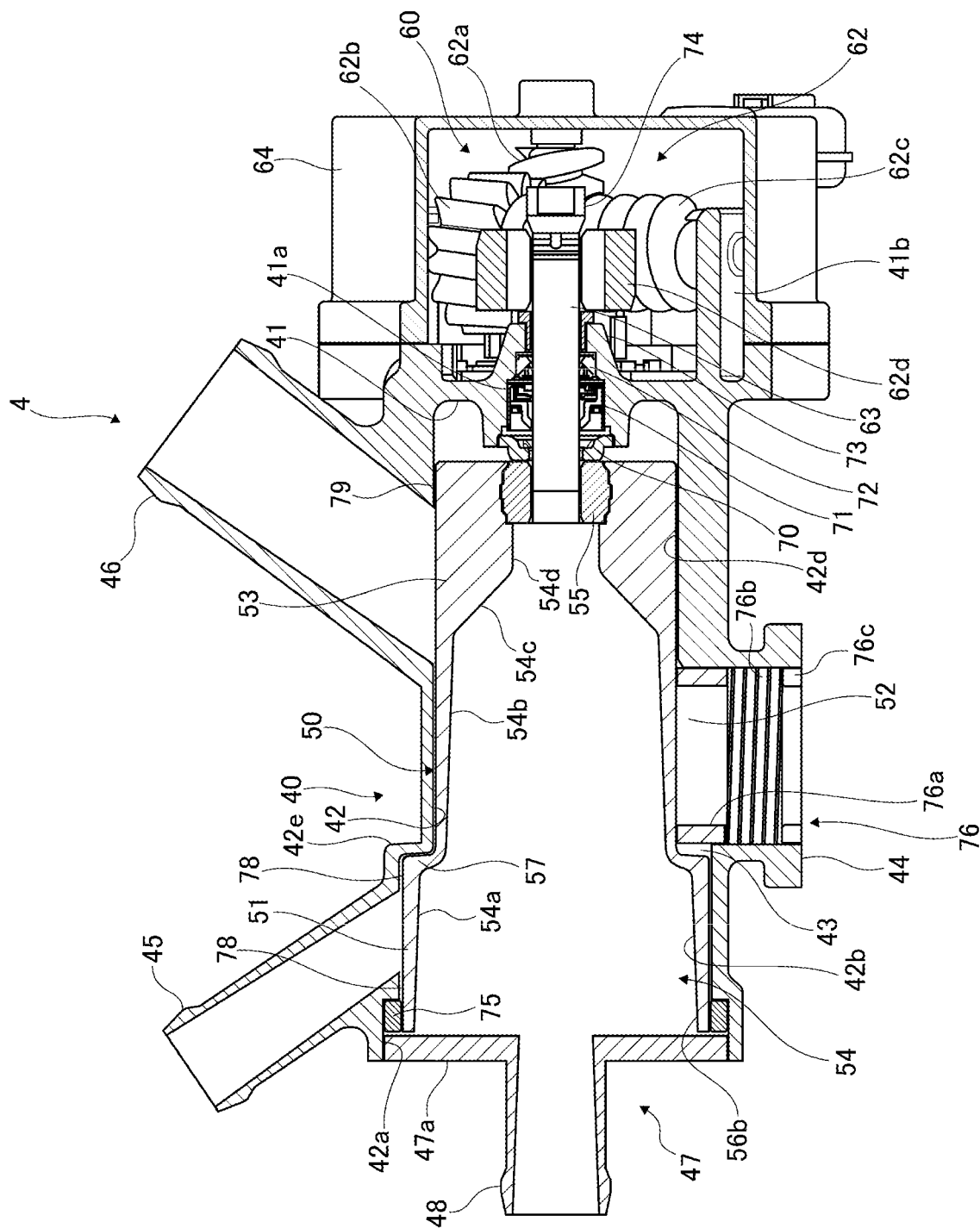
FIG. 11 is a cross-sectional view of a mechanical control valve according to a second embodiment.
Figure 12:
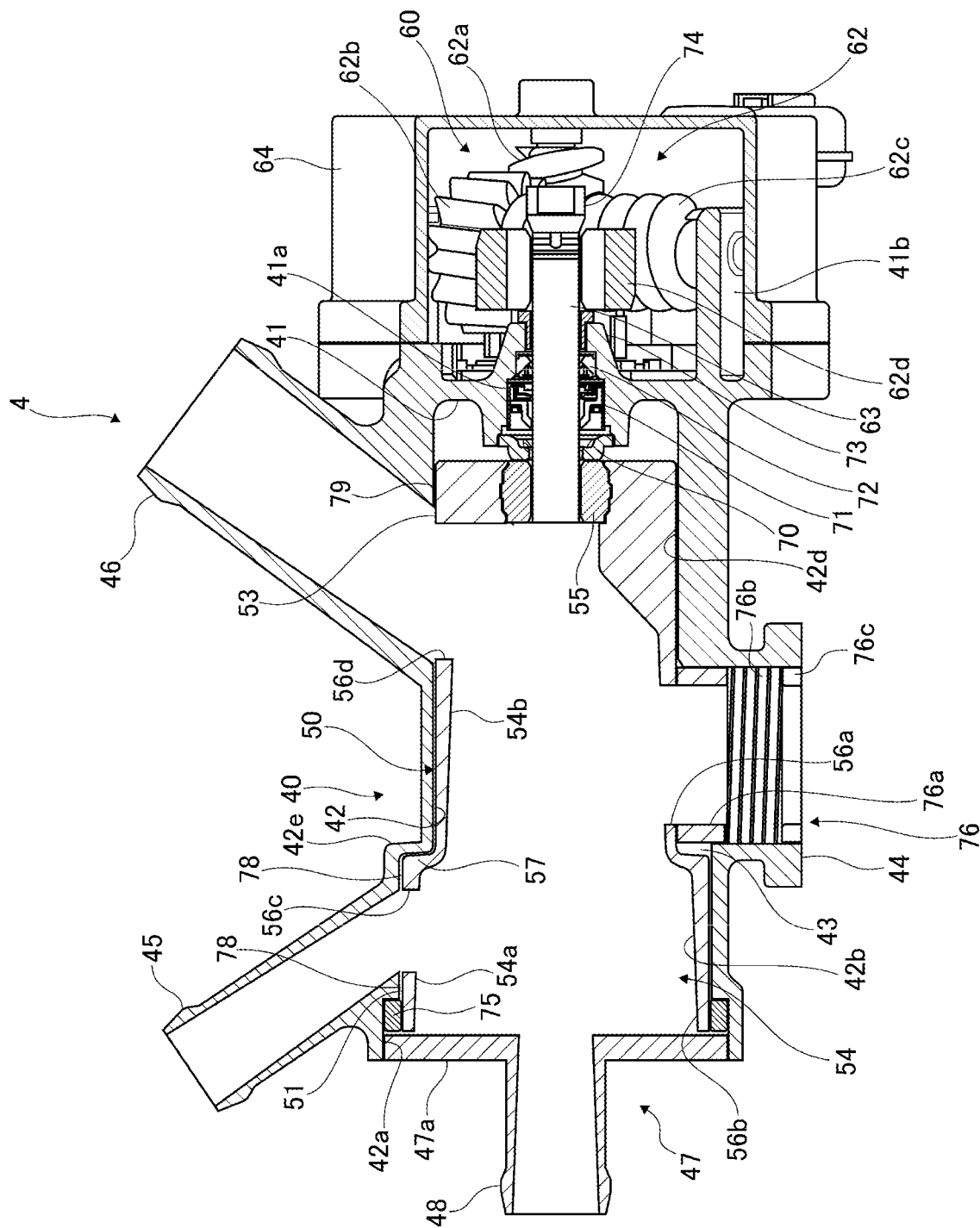
FIG. 12 is a cross-sectional view of the mechanical control valve according to the second embodiment.

FIG. 11 is a cross-sectional view of the mechanical control valve 4 (the completely closed state). FIG. 12 is a cross-sectional view of the mechanical control valve 4 (the completely opened state).

The outer peripheral surface of the valve body 50 includes the large-diameter portion 51 and the small-diameter portion 53. A stepped portion 57 is formed between the large-diameter portion 51 and the small diameter portion 53 of the valve body 50. The stepped portion 57 has a surface extending in the radial direction of the valve body 50 from the small-diameter portion 53 toward the large-diameter portion 51. A stepped portion 42e is provided near the portion of the inner peripheral surface 42 of the housing 40 where the second auxiliary communication hole 45 is opened. The stepped portion 42e is formed along a shape of the stepped portion 57 of the valve body 50. The seal portion 78, which is provided between the second auxiliary communication hole 45 and the valve body 50, is formed by a space between the stepped portion 57 of the valve body 50 and the stepped portion 42e of the housing 40. The pressure drop caused on the cooling water at the seal portion 78 is adjusted according to a length of the seal portion 78 (the space) in the radial direction of the housing 40 (the radial direction with respect to the rotational axis of the valve body 50).

Advantageous Effects

(15) The pressure drop is set according the length of the portion extending in the radial direction with respect to the rotational axis of the valve body 50 in the length of the seal portion 78 (the space portion) formed between the inner peripheral surface 42 of the valve body containing portion 43 and the outer peripheral surface of the valve body 50.

Due to this configuration, the pressure drop can be easily set.

Third Embodiment

In the second embodiment, the configuration of the seal portion 78 is partially modified. In the following description, a configuration of the mechanical control valve 4 according to the third embodiment will be described, but a similar configuration to the first embodiment will be identified by the same reference numeral and a description thereof will be omitted.

Figure 13:
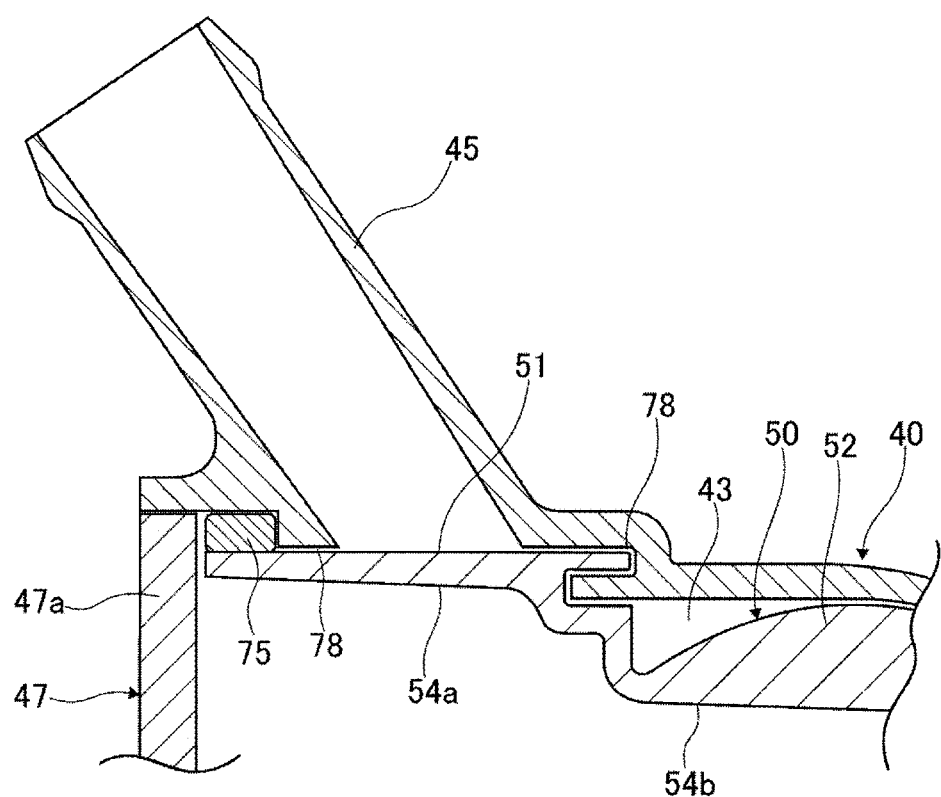
FIG. 13 is a cross-sectional view of a second auxiliary communication hole and the vicinity thereof according to a third embodiment.

FIG. 13 is a cross-sectional view of the second auxiliary communication hole 45 and the vicinity thereof. In the third embodiment, a part of the seal portion 78 is formed by a labyrinth seal constructed by combining a portion extending in the direction along the rotational axis of the valve body 50 and a portion extending in the radial direction with respect to the rotational axis in a space portion defined between the inner peripheral surface 42 of the valve body containing portion 43 and the outer peripheral surface of the valve body 50.

Advantageous Effects

(16) The pressure drop is caused by forming the labyrinth seal constructed by combining the portion extending in the direction along the rotational axis of the valve body 50 and the portion extending in the radial direction with respect to the rotational axis in the space portion formed between the inner peripheral surface 42 of the valve body containing portion 43 and the outer peripheral surface of the valve body 50.

Due to this configuration, the pressure drop can be easily set.

Fourth Embodiment

In the second embodiment, the configurations of the second auxiliary communication hole 45 and the third auxiliary communication hole 46 are modified. In the following description, a configuration of the mechanical control valve 4 according to the fourth embodiment will be described, but a similar configuration to the first embodiment will be identified by the same reference numeral and a description thereof will be omitted.

Figure 14:
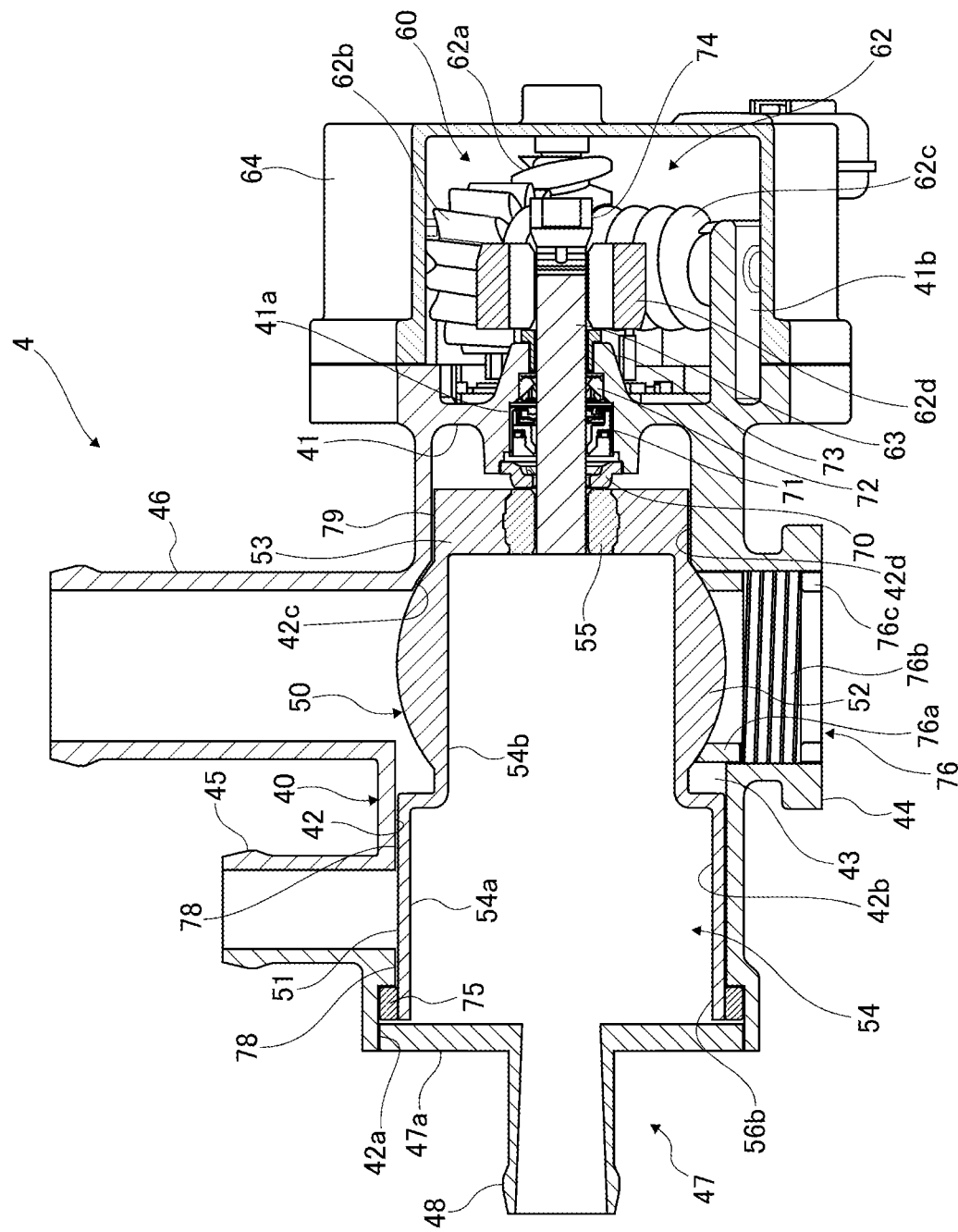
FIG. 14 is a cross-sectional view of a mechanical control valve according to a fourth embodiment.
Figure 15:
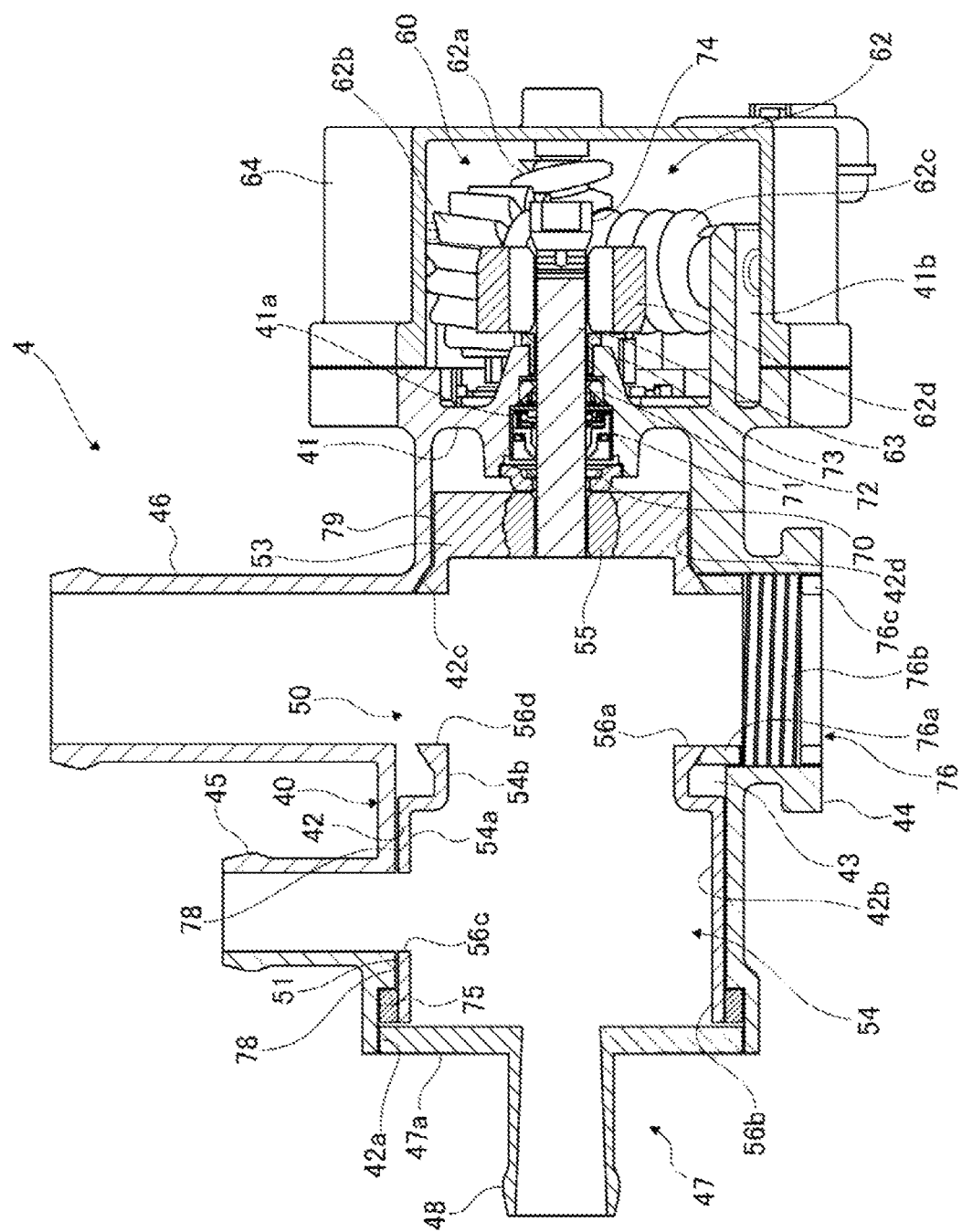
FIG. 15 is a cross-sectional view of the mechanical control valve according to the fourth embodiment.

FIG. 14 is a cross-sectional view of the mechanical control valve 4 (the completely closed state). FIG. 15 is a cross-sectional view of the mechanical control valve 4 (the completely opened state). The second auxiliary communication hole 45 is provided on the outer peripheral surface of the housing 40. The second auxiliary communication hole 45 is formed so as to extend in the radial direction of the housing 40. The third auxiliary communication hole 46 is provided on the outer peripheral surface of the housing 40 adjacently to the second auxiliary communication hole 45. The third auxiliary communication hole 46 is formed so as to extend in the radial direction of the housing 40.

The main communication hole 44 and the third auxiliary communication hole 46 are aligned on the same straight line. This configuration facilitates the outflow of the cooling water from the third auxiliary communication hole 46 into the radiator 7 after the inflow thereof from the engine 1 into the main communication hole 44, thereby achieving efficient cool-down of the cooling water, when the mechanical control valve 40 is in the completely opened state.

Advantageous Effects

(17) The second auxiliary communication hole 45 and the third auxiliary communication hole 46 are provided so as to extend from the outer peripheral surface of the housing 40 in the radiation direction with respect to the rotational axis of the valve body 50.

Due to this configuration, the outer appearance of the mechanical control valve 4 can be changed according to the pipe arrangement in the engine room.

Fifth Embodiment

In a fifth embodiment, the configuration of the speed reducer 62 of the drive mechanism 60 is modified. In the following description, a configuration of the mechanical control valve 4 according to the fifth embodiment will be described, but a similar configuration to the first embodiment will be identified by the same reference numeral and a description thereof will be omitted.

Figure 16:
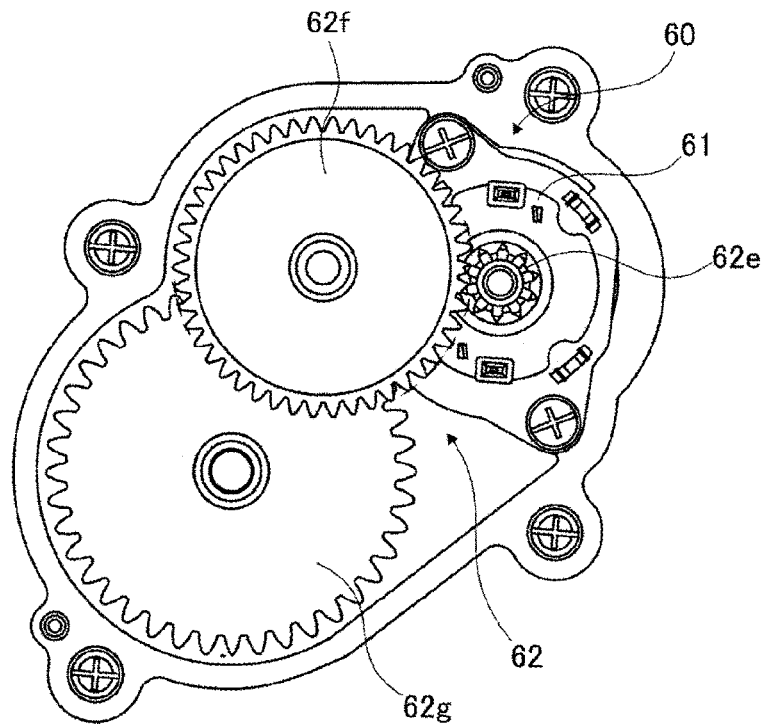
FIG. 16 illustrates a drive mechanism according to a fifth embodiment.

FIG. 16 illustrates the drive mechanism 60. The speed reducer 62 includes a first gear 62e, a second gear 62f, and a third gear 62g. All of the first gear 62e, the second gear 62f, and the third gear 62g are spur gears. The first gear 62e is provided integrally rotatably with the output shaft of the motor 61. The first gear 62e is meshed with the second gear 62f. The second gear 62f is meshed with the third gear 62g. The third gear 62g is provided at the distal end portion of the drive shaft 63 integrally rotatably with the drive shaft 63.

Advantageous Effects

(18) The drive mechanism 60 slows down the output of the motor 61 with use of the pair of spur gears, and transmits this slowed output to the valve body 50 as the rotational drive force.

Due to this configuration, the speed reducer 62 can be constructed with use of the pair of spur gears and thus can be manufactured at low cost.

Therefore, the cooling system can be applied to such a type of system that the mechanical control valve 4 is disposed on the discharge side of the pump 2.

Sixth Embodiment

In a sixth embodiment, the configuration of the circulation circuit of the cooling water is modified. In the following description, the circulation circuit of the cooling water according to the sixth embodiment will be described, but a similar configuration to the first embodiment will be identified by the same reference numeral and a description thereof will be omitted.

Figure 17:
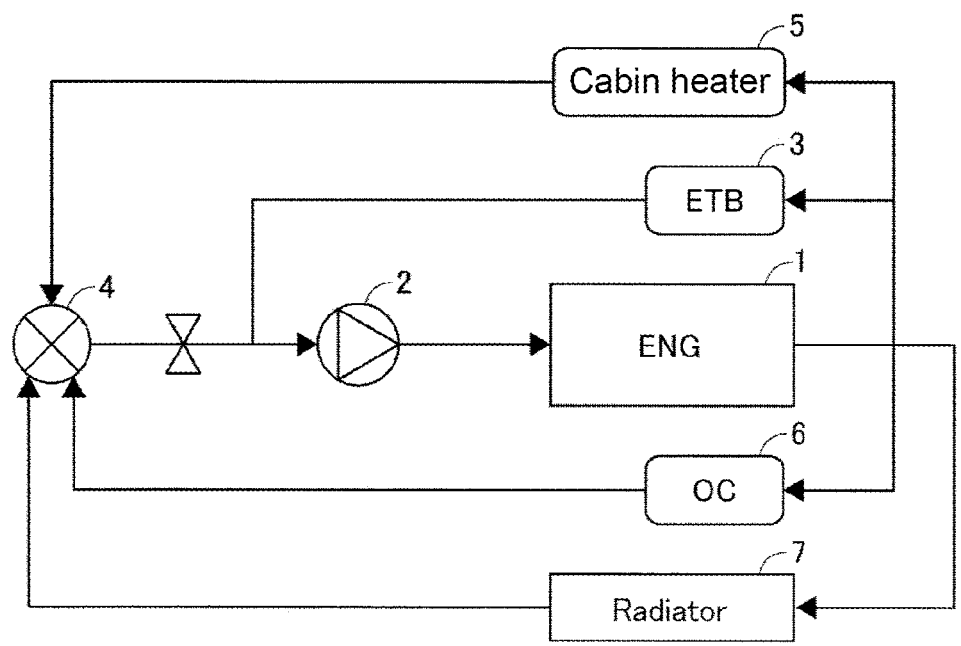
FIG. 17 is a schematic view illustrating a configuration of a circulation circuit of the cooling water that cools down the engine according to a sixth embodiment.

FIG. 17 is a schematic view illustrating a configuration of the circulation circuit of the cooling water that cools down the engine 1. The cooling water is pressure-fed into the engine 1 by the pump 2. After cooling down the engine 1, the cooling water is distributed to the electronic control throttle body 3, the cabin heater 5, the oil cooler 6, and the radiator 7. The cooling water distributed to the electronic control throttle body 3 is returned to the intake side of the pump 2.

The cooling water distributed to the cabin heater 5, the oil cooler 6, and the radiator 7 is transmitted to the mechanical control valve 4. The mechanical control valve 4 switches the valve state between the completely closed state, the first valve opened state, the second valve opened state, and the completely opened state. In the completely closed state, the cooling water flowing out of the cabin heater 5, the oil cooler 6, and the radiator 7 is prohibited from being returned to the intake side of the pump 2. In the first valve opened state, the cooling water flowing out of the cabin heater 5 is returned to the intake side of the pump 2. In the second valve opened state, the cooling water flowing out of the oil cooler 6 is returned to the intake side of the pump 2 in addition of the cooling water flowing out of the cabin heater 5. In the completely opened state, the cooling water flowing out of the radiator 7 is returned to the intake side of the pump 2 in addition to the cooling water flowing out of the cabin heater 5 and the oil cooler 6.

Advantageous Effects

(19) The circuit is formed as the cooling circuit for the engine 1 (the internal combustion engine). The cooling circuit is configured to serve to cool down the engine 1 (the internal combustion engine) by causing the cooling water (the fluid) pressure-fed by the pump 2 to flow in the engine 1 (the internal combustion engine). The pump 2 is connected to the engine 1 (the internal combustion engine) that is the heat source, and disposed on one side where the fluid is supplied to the engine 1 (the internal combustion engine). The main communication hole 44 is connected to the intake side of the pump 2 in the circuit.

Due to this configuration, the cooling system can be applied to such a type of system that the mechanical control valve 4 is disposed on the intake side of the pump 2.

Other Embodiments

Having described the present invention based on the first to fifth embodiments thereof, the specific configuration of each invention is not limited to the first to fifth embodiments, and the present invention also includes a design modification and the like thereof made within a range that does not depart from the spirit of the present invention. Further, the individual components described in the claims and the specification can be arbitrarily combined or omitted within a range that allows them to remain capable of achieving at least a part of the above-described objects or producing at least a part of the above-described advantageous effects.

In the first to fifth embodiments, the engine 1, which is a heat source, is cooled down with use of the cooling water. However, the cool-down target is not limited to the engine 1, and the present invention may also be applied to cooling down, for example, a motor for driving the vehicle or an inverter.

Figure 18:
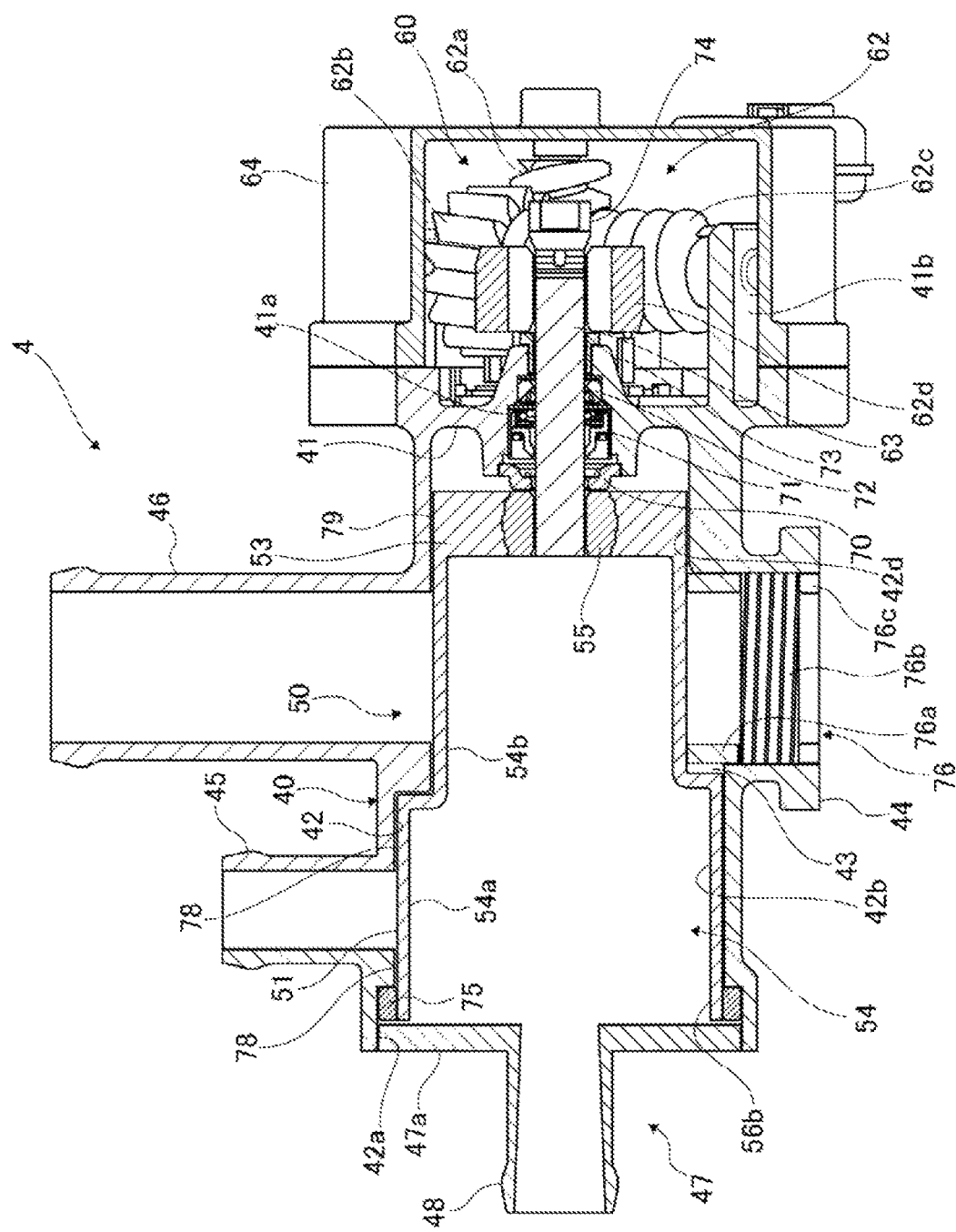
FIG. 18 is a cross-sectional view of a mechanical control valve according to another embodiment.

In the fourth embodiment, the valve body 50 includes the spherical portion 52. This configuration may be modified so as to instead use a cylindrically formed valve body 50 similarly to the valve body 50 according to the second embodiment as illustrated in FIG. 18.

Figure 19:
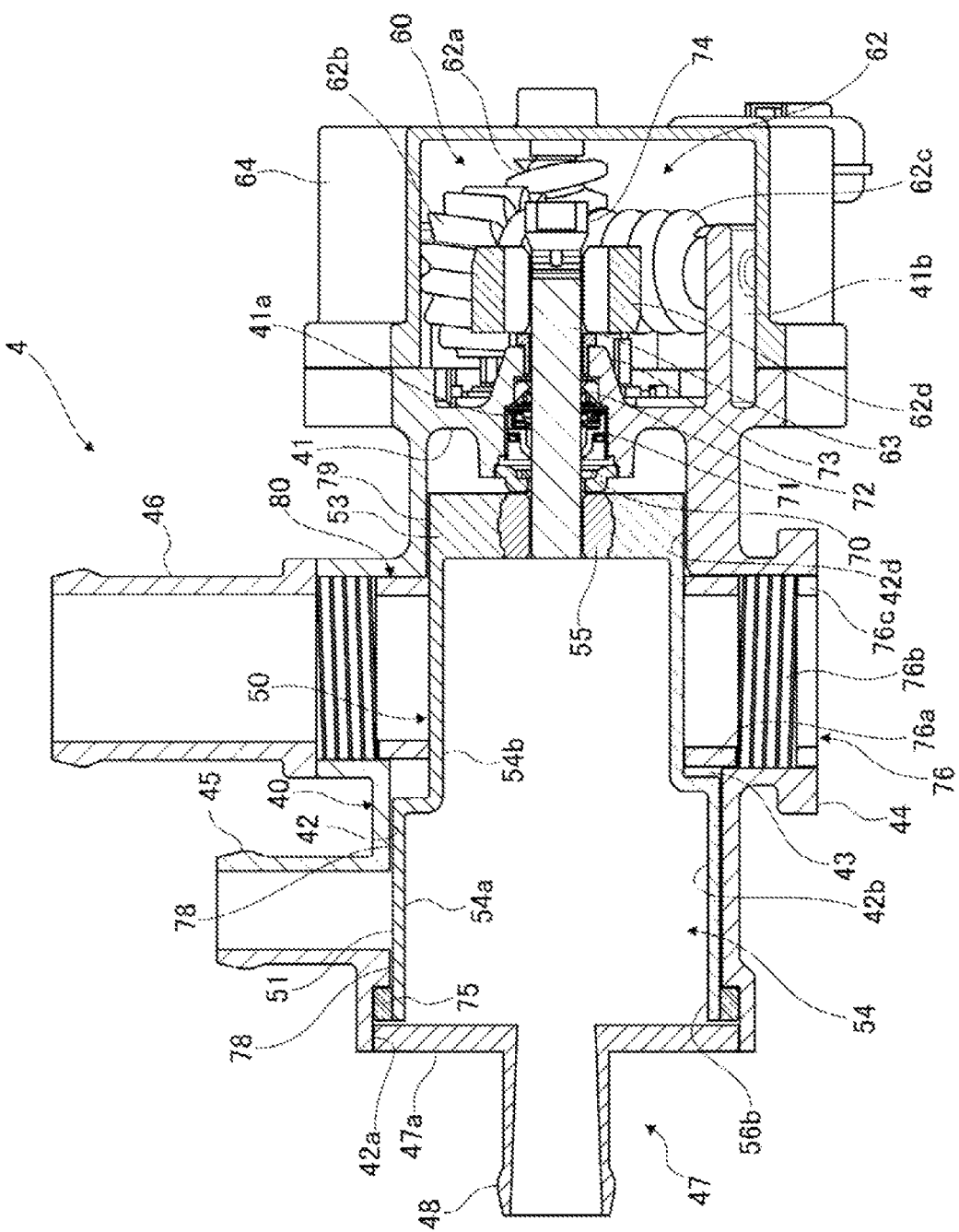
FIG. 19 is a cross-sectional view of a mechanical control valve according to another embodiment.

In the first to fifth embodiments, the seal member 76, which is in contact with the valve body 50, is provided only between the main communication hole 44 and the valve body 50. This configuration may be modified in such a manner that a seal member 80, which is in contact with the valve body 50, is also provided between the third auxiliary communication hole 46 and the valve body 50 as illustrated in FIG. 19. This configuration can prevent or reduce the leak of the cooling water into the radiator 7 having the high performance of cooling the cooling water. In this case, the valve body 50 can be supported by the two seal members 76 and 80, and therefore the sliding bearing 75 may be omitted.

In the following description, technical ideas recognizable from the above-described embodiments will be described.

A fluid control valve, according to one aspect thereof, includes a housing. The housing includes a hollowly formed valve body containing portion, a main communication hole configured to establish communication between the valve body containing portion and an outside and configured to allow fluid to flow therethrough, a first auxiliary communication hole configured to establish the communication between the valve body containing portion and the outside and configured to allow the fluid to flow therethrough, and a second auxiliary communication hole configured to establish the communication between the valve body containing portion and the outside and configured to allow the fluid to flow therethrough. The fluid control valve further includes a valve body. The valve body includes a hollowly formed fluid inflow portion, and a plurality of opening portions configured to establish communication between the fluid inflow portion and the outside. The valve body is rotatably disposed in the valve body containing portion. The fluid control valve further includes a drive mechanism configured to rotationally drive the valve body, and a seal member provided between the main communication hole and the valve body and configured to seal between the housing and the valve body. The valve body constantly establishes the communication between the first auxiliary communication hole and the opening portions regardless of a rotational position, and also changes respective communication states between the main communication hole and the second auxiliary communication hole and the opening portions according to the rotational position. A pressure drop is caused on the fluid leaked out from an outer peripheral surface of the valve body into the second auxiliary communication hole due to a space formed between the valve body containing portion and the valve body. For the pressure drop, an amount of the fluid leaked out into the second auxiliary communication hole is set according to an allowable amount for an apparatus to which the main communication hole is connected, with the main communication hole and the opening portions in communication with each other and the second auxiliary communication hole and the opening portions out of communication with each other.

Due to this aspect, the fluid control valve can reduce the number of seal members in contact with the valve body, thereby reducing friction when the valve body is rotated. Therefore, this aspect can achieve a reduction in the size of the drive mechanism.

According to more preferable aspect, in the above-described aspect, the pressure drop is set according a length of a portion extending in a radial direction with respect to a rotational axis of the valve body in a length of the space portion formed between an inner peripheral surface of the valve body containing portion and the outer peripheral surface of the valve body.

Due to this aspect, the pressure drop can be easily set.

According to further preferable aspect, in any of the above-described aspects, the pressure drop is set according a length of a portion extending in a direction along the rotational axis of the valve body in the length of the space portion formed between the inner peripheral surface of the valve body containing portion and the outer peripheral surface of the valve body.

Due to this aspect, the pressure drop can be easily set.

According to further preferable aspect, in any of the above-described aspects, the pressure drop is caused by forming a labyrinth seal constructed by combining the portion extending in the direction along the rotational axis of the valve body and the portion extending in the radial direction with respect to the rotational axis in the space portion formed between the inner peripheral surface of the valve body containing portion and the outer peripheral surface of the valve body.

Due to this aspect the pressure drop can be easily set.

According to further preferable aspect, in any of the above-described aspects, the main communication hole and the first auxiliary communication hole are in communication with each other without intervention of the space portion formed between the inner peripheral surface of the valve body containing portion and the outer peripheral surface of the valve body, when the main communication hole and the opening portions are in communication with each other.

Due to this aspect, the fluid control valve allows the cooling water to flow out of the first auxiliary communication hole without unnecessarily causing the pressure drop on the cooling water.

According to further preferable aspect, in any of the above-described aspects, the first auxiliary communication hole is connected to a heat exchanger for heating to be used to warm an inside of a vehicle compartment.

Due to this aspect, the inside of the vehicle compartment can be warmed quickly.

According to further preferable aspect, in any of the above-described aspects, the main communication hole and the second auxiliary communication hole are in communication with each other via the space portion formed between the inner peripheral surface of the valve body containing portion and the outer peripheral surface of the valve body, when the main communication hole and the opening portions are in communication with each other and the second auxiliary communication hole and the opening portions are out of communication with each other.

Due to this aspect, the fluid control valve can allow the cooling water to be little leaked out into the second auxiliary communication hole, thereby preventing or cutting down the reduction in the temperature of the cooling water.

According to further preferable aspect, in any of the above-described aspects, the fluid is used to cool down an engine. The second auxiliary communication hole is connected to an oil cooler configured to cool down engine oil for use in lubrication in the engine, or connected to a radiator configured to cool down the fluid.

Due to this aspect, the fluid control valve can allow the cooling water to be little leaked out into the oil cooler or the radiator, thereby preventing or cutting down the reduction in the temperature of the cooling water.

According to further preferable aspect, in any of the above-described aspects, the housing includes a third auxiliary communication hole configured to establish the communication between the valve body containing portion and the outside and configured to allow the fluid to flow therethrough. The valve body changes a communication state between the third auxiliary communication hole and the opening portions according to the rotational position. The main communication hole and the first auxiliary communication hole are in communication with each other without the intervention of the space portion formed between the inner peripheral surface of the valve body containing portion and the outer peripheral surface of the valve body, when the main communication hole and the opening portions are in communication with each other. The main communication hole and the second auxiliary communication hole are in communication with each other via the space portion formed between the inner peripheral surface of the valve body containing portion and the outer peripheral surface of the valve body, when the main communication hole and the opening portions are in communication with each other and the second auxiliary communication hole and the opening portions are out of communication with each other. The main communication hole and the third auxiliary communication hole are in communication with each other via the space portion formed between the inner peripheral surface of the valve body containing portion and the outer peripheral surface of the valve body, when the main communication hole and the opening portions are in communication with each other and the third auxiliary communication hole and the opening portions are out of communication with each other. The pressure drop at the space portion between the main communication hole and the third auxiliary communication hole is larger than the pressure drop at the space portion between the main communication hole and the second auxiliary communication hole.

Due to this aspect, when the second auxiliary communication hole and the third auxiliary communication hole are out of communication with the opening portions of the valve body, the fluid control valve can allow the cooling water to be little leaked out into the second auxiliary communication hole and the third auxiliary communication hole, thereby preventing or cutting down the reduction in the temperature of the cooling water.

According to further preferable aspect, in any of the above-described aspects, the oil cooler configured to cool down the engine oil for use in the lubrication in the engine is connected to the second auxiliary communication hole. The radiator configured to cool down the fluid is connected to the third auxiliary communication hole.

Due to this aspect, the fluid control valve can reduce the amount of the cooling water flowing out to the radiator having a high performance of cooling the cooling water, thereby preventing or cutting down the reduction in the temperature of the cooling water.

According to further preferable aspect, in any of the above-described aspects, the main communication hole is provided at an axially central portion of the housing in the direction along the rotational axis of the valve body.

Due to this aspect, the fluid control valve can allow the second auxiliary communication hole and the third auxiliary communication hole to be located approximately equal distance away from the main communication hole, thereby achieving approximately even supply of the cooling water from the main communication hole to each of the auxiliary communication holes.

According to further preferable aspect, in any of the above-described aspects, the housing includes the third auxiliary communication hole configured to establish the communication between the valve body containing portion and the outside and configured to allow the fluid to flow therethrough. The second auxiliary communication hole is provided on an opposite side of the main communication hole from the third auxiliary communication hole in the direction along the rotational axis of the valve body.

Due to this aspect, the fluid control valve can allow the second auxiliary communication hole and the third auxiliary communication hole to be located approximately equal distance away from the main communication hole, thereby achieving approximately even supply of the cooling water from the main communication hole to each of the auxiliary communication holes.

According to further preferable aspect, in any of the above-described aspects, the second auxiliary communication hole and the third auxiliary communication hole are provided so as to extend from the outer peripheral surface of the housing in the radiation direction with respect to the rotational axis of the valve body.

An outer appearance of the flow rate control valve can be changed according to pipe arrangement.

According to further preferable aspect, in any of the above-described aspects, the drive mechanism includes a drive shaft configured to rotate integrally with the valve body, an insertion hole penetrating through a bottom portion of the valve body containing portion and configured to allow the drive shaft to be inserted therethrough, and a support member configured to rotatably support the drive shaft at each of both axial ends of the insertion hole.

Due to this aspect, the drive shaft can be stably supported.

According to further preferable aspect, in any of the above-described aspects, the drive mechanism slows down an output of a motor with use of a pair of spur gears, and transmits the slowed output to the valve body as a rotational drive force.

Due to this aspect, the drive mechanism can be manufactured at low cost.

Further, from another aspect, a cooling system includes a housing. The housing includes a hollowly formed valve body containing portion, a main communication hole configured to establish communication between the valve body containing portion and an outside and configured to allow fluid cooling down a heat source to flow therein, and a plurality of auxiliary communication holes configured to distribute the fluid flowing in from the main communication hole to a heat exchanger. The cooling system further includes a valve body. The valve body includes a hollowly formed fluid inflow portion, and a plurality of opening portions configured to establish communication between the fluid inflow portion and the outside. The valve body is rotatably disposed in the valve body containing portion. The cooling system further includes a contact seal member provided between the main communication hole and the valve body and configured to seal between the valve body and the housing by abutting against an outer peripheral surface of the valve body. The valve body changes respective communication states between the main communication hole and the auxiliary communication holes and the opening holes according to a rotational position. The auxiliary communication holes include a first auxiliary communication hole constantly in communication with the opening portions and a second auxiliary communication hole configured to be switched between a state in communication with the opening portions and a state out of communication with the opening portions according to the rotational position of the valve body. The second auxiliary communication hole allows the fluid to flow therethrough via a non-contact seal formed between an inner peripheral surface of the valve body containing portion and the outer peripheral surface of the valve body, with the main communication hole and the opening portions in communication with each other and the second auxiliary communication hole and the opening portions out of communication with each other.

Due to this aspect, the cooling system can reduce the number of seal members in contact with the valve body, thereby reducing the friction when the valve body is rotated. Therefore, this aspect can achieve a reduction in the size of the drive mechanism.

Further, from another aspect, a cooling system includes a heat exchanger configured to cool down inflowing fluid, a circuit provided so as to extend through the heat exchanger and configured to serve to cool down a heat source by circulating the fluid cooled down at the heat exchanger, and a flow rate control valve configured to control a flow rate of the fluid circulated in the circuit. The flow rate control valve includes a housing. The housing includes a hollowly formed valve body containing portion, a main communication hole connected to the heat source and configured to establish communication between the valve body containing portion and an outside and allow the fluid to flow therethrough, a first auxiliary communication hole configured to establish the communication between the valve body containing portion and the outside and configured to allow the fluid to flow therethrough, and a second auxiliary communication hole configured to establish the communication between the valve body containing portion and the outside and configured to allow the fluid to flow therethrough. The flow rate control valve further includes a valve body. The valve body includes a hollowly formed fluid inflow portion and a plurality of opening portions configured to establish communication between the fluid inflow portion and the outside. The valve body is rotatably disposed in the valve body containing portion. The flow rate control valve further includes a drive mechanism configured to rotationally drive the valve body, and a seal member provided between the main communication hole and the valve body and configured to seal between the housing and the valve body. The valve body constantly establishes the communication between the first auxiliary communication hole and the opening portions regardless of a rotational position of the valve body, and also changes respective communication states between the main communication hole and the second auxiliary communication hole and the opening portions according to the rotational position. A pressure drop is caused on the fluid leaked out from the outer peripheral surface of the valve body into the second auxiliary communication hole due to a space portion formed between the valve body containing portion and the valve body. For the pressure drop, an amount of the fluid leaked out into the second auxiliary communication hole is set according to an allowable amount for an apparatus to which the main communication hole is connected, with the main communication hole and the opening portions in communication with each other and the second auxiliary communication hole and the opening portions out of communication with each other.

Due to this aspect, the cooling system can reduce the number of seal members in contact with the valve body, thereby reducing the friction when the valve body is rotated. Therefore, this configuration can achieve a reduction in the size of the drive mechanism.

According to further preferable aspect, in the above-described aspect, the circuit is formed as a cooling circuit for an internal combustion engine. The cooling circuit is configured to serve to cool down the internal combustion engine by causing the fluid pressure-fed by a pump to flow in the internal combustion engine. The pump is connected to the internal combustion engine that is the heat source, and disposed on one side where the fluid is supplied to the internal combustion engine. The main communication hole is connected to a discharge side of the pump in the circuit.

Due to this aspect, the cooling system can be applied to such a type of system that the fluid rate control valve is disposed on the discharge side of the pump.

According to further preferable aspect, in any of the above-described aspects, the circuit is formed as a cooling circuit for an internal combustion engine. The cooling circuit is configured to serve to cool down the internal combustion engine by causing the fluid pressure-fed by a pump to flow in the internal combustion engine. The pump is connected to the internal combustion engine that is the heat source, and disposed on one side where the fluid is supplied to the internal combustion engine. The main communication hole is connected to an intake side of the pump in the circuit.

Due to this aspect, the cooling system can be applied to such a type of system that the fluid rate control valve is disposed on the intake side of the pump.

The present application claims priority to Japanese Patent Application No. 2016-52299 filed on Mar. 16, 2016. The entire disclosure of Japanese Patent Application No. 2016-52299 filed on Mar. 16, 2016 including the specification, the claims, the drawings, and the abstract is incorporated herein by reference in its entirety.

REFERENCE SIGN LIST 1 engine
5 cabin heater
6 oil cooler
7 radiator
40 housing
41 bottom portion
41a insertion hole
43 valve body containing portion
44 main communication hole
45 second auxiliary communication hole
46 third auxiliary communication hole
48 first auxiliary communication hole
50 valve body
54 fluid inflow portion
56a main opening portion
56b first auxiliary opening portion
56c second auxiliary opening portion
60 drive mechanism
63 drive shaft
70 first bearing
73 second bearing
76 seal member
78 seal portion
79 seal portion

The invention claimed is:

1. A flow rate control valve provided in a cooling circuit of an engine comprising:
  a housing including:
    a valve body containing portion hollowly formed by a housing circumferential wall;
    a main communication hole formed on the housing circumferential wall, and configured to allow fluid to flow between the valve body containing portion and the engine;
    a first auxiliary communication hole formed on the housing circumferential wall, and configured to allow the fluid to flow between the valve body containing portion and a heat exchanger for a heater provided in the cooling circuit; and
    a third auxiliary communication hole formed on the housing circumferential wall, and configured to allow the fluid to flow between the valve body containing portion and a radiator provided in the cooling circuit;
  a valve body including:
    a fluid inflow portion hollowly formed by a valve body circumferential wall;
    a main opening portion formed on the valve body circumferential wall, and configured to establish communication between the fluid inflow portion and the main communication hole;
    a first auxiliary opening portion formed on the valve body circumferential wall, and configured to establish communication between the fluid inflow portion and the first auxiliary commination hole; and
    a third auxiliary opening portion formed on the valve body circumferential wall, and configured to establish communication between the fluid inflow portion and the third auxiliary communication hole,
    the valve body including a space portion between an inner peripheral surface of the valve containing portion and an outer peripheral surface of the valve body circumferential wall;
  a motor system configured to rotationally drive the valve body; and
  a seal member provided between the main communication hole and the valve body, and configured to seal between the valve body and the main communication hole by abutting against the outer peripheral surface of the valve body circumferential wall,
  wherein the valve body establishes the communication between the first auxiliary communication hole and the first auxiliary opening portion regardless of a rotational position of the valve body,
  wherein the valve body changes a communication state between the main communication hole and the main opening portion and a communication state between the third auxiliary communication hole and the third auxiliary opening portion according to the rotational position of the valve body,
  wherein the valve body includes a rotational position in which the main communication hole and the main opening portion do not overlap with each other and the third auxiliary communication hole and the third auxiliary opening portion do not overlap with each other, and a rotational position in which the main communication hole and the main opening portion overlap with each other while the third auxiliary communication hole and the third auxiliary opening portion do not overlap with each other according to the rotational position of the valve body, wherein the space portion causes a pressure drop of the fluid leaked out from the valve body containing portion into the third auxiliary communication hole via the space portion at the rotational position in which the main communication hole and the main opening portion overlap with each other while the third auxiliary communication hole and the third auxiliary opening portion do not overlap with each other, and wherein an amount of the fluid leaked out into the third auxiliary communication hole is set according to an allowable amount for cooling of the engine to which the main communication hole is connected at the rotational position in which the main communication hole and the main opening portion overlap with each other while the third auxiliary communication hole and the third auxiliary opening portion do not overlap with each other.

2. The flow rate control valve according to claim 1, wherein the pressure drop is set according a length of a portion extending in a radial direction with respect to a rotational axis of the valve body in a length of the space portion.

3. The flow rate control valve according to claim 1, wherein the pressure drop is set according a length of a portion extending in a direction along a rotational axis of the valve body in a length of the space portion.

4. The flow rate control valve according to claim 1, wherein the main communication hole and the first auxiliary communication hole are in communication with each other without intervention of the space portion when the main communication hole and the main opening portion are in communication with each other.

5. The flow rate control valve according to claim 4, wherein the main communication hole and the third auxiliary communication hole are in communication with each other via the space portion when the main communication hole and the main opening portion are in communication with each other and the third auxiliary communication hole and the third auxiliary opening portion are out of communication with each other.

6. The flow rate control valve according to claim 1, wherein the main communication hole is provided at an axially central portion of the housing in a direction along a rotational axis of the valve body.

7. The flow rate control valve according to claim 1, wherein the motor system includes:
a drive shaft configured to rotate integrally with the valve body;
an insertion hole configured to penetrate through a bottom portion of the valve body containing portion and configured to allow the drive shaft to be inserted therethrough; and
a support member configured to rotatably support the drive shaft at each of both axial ends of the insertion hole.

8. The flow rate control valve according to claim 1, wherein the motor system slows down an output of a motor with use of a pair of spur gears, and transmits the slowed output to the valve body as a rotational drive force.

9. A cooling system comprising:
a heat exchanger configured to cool down inflowing fluid;
a circuit provided so as to extend through the heat exchanger, and configured to serve to cool down an engine by circulating the fluid cooled down at the heat exchanger; and
a flow rate control valve configured to control a flow rate of the fluid circulated in the circuit,
the flow rate control valve including:
a housing including:
a valve body containing portion hollowly formed by a housing circumferential wall;
a main communication hole formed on the housing circumferential wall, the main communication hole being configured to establish communication between the valve body containing portion and the engine and to allow the fluid to flow therethrough;
a first auxiliary communication hole formed on the housing circumferential wall, and configured to establish the communication between the valve body containing portion and the heat exchanger for a heater and to allow the fluid to flow therethrough; and
a third auxiliary communication hole formed on the housing circumferential wall, and configured to establish the communication between the valve body containing portion and a radiator and to allow the fluid to flow therethrough;
a valve body including:
a fluid inflow portion hollowly formed by a valve body circumferential wall;
a main opening portion provided on the valve body circumferential wall, and configured to establish communication between the fluid inflow portion and the main communication hole;
a first auxiliary opening portion provided on the valve body circumferential wall, and configured to establish communication between the fluid inflow portion and the first auxiliary commination hole; and
a third auxiliary opening portion provided on the valve body circumferential wall, and configured to establish communication between the fluid inflow portion and the third auxiliary communication hole,
the valve body being provided so as to form a space portion between an inner peripheral surface of the valve body containing portion and an outer peripheral surface of the valve body circumferential wall;
a motor system configured to rotationally drive the valve body; and
a seal member provided between the main communication hole and the valve body, and configured to seal between the valve body and the main communication hole by abutting against the outer peripheral surface of the valve body circumferential wall,
wherein the valve body establishes the communication between the first auxiliary communication hole and the first auxiliary opening portion regardless of a rotational position of the valve body,
wherein the valve body changes a communication state between the main communication hole and the main opening portion and a communication state between the third auxiliary communication hole and the third auxiliary opening portion according to the rotational position of the valve body,
wherein a pressure drop is caused, due to the space portion, as to the fluid leaked out from the valve body containing portion into the third auxiliary communication hole via the space portion, and wherein an amount of the fluid leaked out into the third auxiliary communication hole is set according to an allowable amount for cooling of the engine to which the main communication hole is connected, with the main communication hole and the main opening portion in communication with each other and the third auxiliary communication hole and the third auxiliary opening portion out of communication with each other.

10. The cooling system according to claim 9, wherein the circuit is formed as a cooling circuit for the engine, the cooling circuit being configured to serve to cool down the engine by causing the fluid pressure-fed by a pump to flow in the engine, the pump being disposed on one side where the fluid is supplied to the engine, and wherein the main communication hole is connected to a discharge side of the pump in the circuit.

11. The cooling system according to claim 9, wherein the circuit is formed as a cooling circuit for the engine, the cooling circuit being configured to serve to cool down the engine by causing the fluid pressure-fed by a pump to flow in the engine, the pump being disposed on one side where the fluid is supplied to the engine, and wherein the main communication hole is connected to an intake side of the pump in the circuit.

12. A flow rate control valve provided in a cooling circuit of an engine comprising:
a housing including:
a valve body containing portion hollowly formed by a housing circumferential wall;
a main communication hole formed on the housing circumferential wall, and configured to allow fluid from the engine to flow in between the valve body containing portion and the engine;
an auxiliary communication hole formed on the housing circumferential wall, and configured to allow the fluid to flow between the valve body containing portion and a radiator provided in the cooling circuit of the engine;
a valve body including:
a fluid inflow portion hollowly formed by a valve body circumferential wall;
a main opening portion formed on the valve body circumferential wall, and configured to establish communication between the fluid inflow portion and the main communication hole; and
an auxiliary opening portion formed on the valve body circumferential wall, and configured to establish communication between the fluid inflow portion and the auxiliary commination hole,
the valve body including a space portion between an inner peripheral surface of the valve containing portion and an outer peripheral surface of the valve body circumferential wall;
a motor system configured to rotationally drive the valve body; and
a seal member provided between the main communication hole and the valve body, and configured to seal between the valve body and the main communication hole by abutting against the outer peripheral surface of the valve body circumferential wall,
wherein the valve body is, by being rotationally driven by the motor system, adjustable to
a first rotational position in which the main communication hole and the main opening portion do not overlap with each other and the auxiliary communication hole and the auxiliary opening portion do not overlap with each other,
a second rotational position in which the main communication hole and the main opening portion overlap with each other while the auxiliary communication hole and the auxiliary opening portion do not overlap with each other, and the fluid leaks out via the space portion between the main communication hole and the auxiliary communication hole, and
a third rotational position in which the main communication hole and the main opening portion overlap with each other and the auxiliary communication hole and the auxiliary opening portion overlap with each other,
wherein the space portion is constantly in communication with the auxiliary communication hole, and
wherein, in the second rotational position, the main communication hole and the fluid inflow portion are in communication with each other via the main opening portion, the fluid inflow portion and the space portion are in communication with each other via the auxiliary opening portion, and the space portion and the auxiliary communication hole are in communication with each other.

13. The flow rate control valve according to claim 12, wherein the main communication hole and the auxiliary communication hole are structured such that fluid flowing into the main communication hole and the auxiliary communication hole causes a pressure drop by passing through a gap section when the valve body is at the second rotational position.

14. The flow rate control valve according to claim 12, wherein the main communication hole is provided at an axially central portion of the housing in a direction along a rotational axis of the valve body.

15. The flow rate control valve according to claim 14, wherein the housing includes a sub auxiliary communication hole configured to establish communication between the valve body containing portion and an external device separate from the radiator and configured to allow fluid to flow therethrough, and wherein the auxiliary communication hole is provided on an opposite side of the main communication hole from the sub auxiliary communication hole in the direction along the rotational axis of the valve body.

16. The flow rate control valve according to claim 15, wherein the auxiliary communication hole and the sub auxiliary communication hole are provided so as to extend from an outer circumferential surface of the housing in a radial direction with respect to the rotational axis of the valve body.

17. The flow rate control valve according to claim 12, wherein the motor system comprises:
a drive shaft configured to rotate integrally with the valve body;
an insertion hole configured to penetrate through a bottom portion of the valve body containing portion and configured to allow the drive shaft to be inserted therethrough; and
a support member configured to rotatably support the drive shaft at each of both axial ends of the insertion hole.

18. The flow rate control valve according to claim 12, wherein the motor system is configured to slow down an output of a motor via a pair of spur gears, and transmit the slowed output to the valve body as a rotational drive force.

* * * * *